(12) United States Patent
Fujita

(10) Patent No.: US 9,501,198 B2
(45) Date of Patent: Nov. 22, 2016

(54) TOUCH PANEL

(71) Applicant: FUJITSU COMPONENT LIMITED, Tokyo (JP)

(72) Inventor: Kenichi Fujita, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 92 days.

(21) Appl. No.: 14/256,223

(22) Filed: Apr. 18, 2014

(65) Prior Publication Data

US 2015/0009424 A1 Jan. 8, 2015

(30) Foreign Application Priority Data

Jul. 5, 2013 (JP) ................................. 2013-141909

(51) Int. Cl.
*G06F 3/045* (2006.01)

(52) U.S. Cl.
CPC ..... *G06F 3/045* (2013.01); *G06F 2203/04113* (2013.01)

(58) Field of Classification Search
CPC .................... G06F 3/045; G06F 2203/04113
USPC .............................. 345/173, 174; 178/18.05
See application file for complete search history.

(56) References Cited

U.S. PATENT DOCUMENTS

| 5,453,941 | A | 9/1995 | Yoshikawa |
| 2009/0153509 | A1 | 6/2009 | Jiang et al. |
| 2009/0189877 | A1* | 7/2009 | Washino .................. G06F 3/045 345/174 |
| 2011/0025642 | A1 | 2/2011 | Tada et al. |
| 2011/0279404 | A1 | 11/2011 | Tada |
| 2012/0019477 | A1 | 1/2012 | Fujita et al. |
| 2012/0127125 | A1 | 5/2012 | Ito et al. |
| 2012/0262417 | A1* | 10/2012 | Wakasugi ............. G06F 3/0416 345/174 |

FOREIGN PATENT DOCUMENTS

| JP | 6-139004 | 5/1994 |
| JP | 6-309087 | 11/1994 |
| JP | 9-34625 | 2/1997 |
| JP | 2009-146419 | 7/2009 |
| JP | 2011-76591 | 4/2011 |

(Continued)

OTHER PUBLICATIONS

Patent Abstracts of Japan, Publication No. 06-139004, Published May 20, 1994.

(Continued)

*Primary Examiner* — Jimmy H Nguyen
(74) *Attorney, Agent, or Firm* — Staas & Halsey LLP

(57) ABSTRACT

A touch panel includes: a first resistance film; a second resistance film spaced apart from the first resistance film; a first electrode and a second electrode that are provided on the first resistance film, and are opposite to each other in a first direction; a third electrode and a fourth electrode that are provided on the second resistance film, and are opposite to each other in a second direction; an application unit that applies voltages to the first to the fourth electrodes, respectively; and a coordinate detection unit that, when the first resistance film comes in contact with the second resistance film at two points, detects coordinates of the two points based on a voltage applied between the first and the second electrodes, a voltage applied between the third and the fourth electrodes, and a voltage caused by a contact resistance between the first and the second resistance films.

12 Claims, 14 Drawing Sheets

(56) References Cited

FOREIGN PATENT DOCUMENTS

| JP | 2011-216001 | 10/2011 |
| JP | 2012-94003 | 5/2012 |
| JP | 2012-123787 | 6/2012 |

OTHER PUBLICATIONS

Patent Abstracts of Japan, Publication No. 06-309087, Published Nov. 4, 1994.
Patent Abstracts of Japan, Publication No. 09-034625, Published Feb. 7, 1997.
Patent Abstracts of Japan, Publication No. 2009-146419, Published Jul. 2, 2009.
Patent Abstracts of Japan, Publication No. 2011-076591, Published Apr. 14, 2011.
Patent Abstracts of Japan, Publication No. 2011-216001, Published Oct. 27, 2011.
Patent Abstracts of Japan, Publication No. 2012-094003, Published May 17, 2012.
Patent Abstracts of Japan, Publication No. 2012-123787, Published Jun. 28, 2012.

* cited by examiner

TOUCH PANEL

CROSS-REFERENCE TO RELATED APPLICATION

This application is based upon and claims the benefit of priority of the prior Japanese Patent Application No. 2013-141909 filed on Jul. 5, 2013, the entire contents of which are incorporated herein by reference.

FIELD

A certain aspect of the embodiments is related to a touch panel.

BACKGROUND

A resistance film type touch panel is formed so that two resistance films are opposite to each other. When the touch panel is depressed with a finger, a pen or the like, and the resistance films mutually contact and are conducted, the touch panel of this type detects the coordinates of a contacted point (see Japanese Laid-open Patent Publication No. 6-309087 and Japanese Laid-open Patent Publication No. 6-139004). In addition, when the resistance films contact at two points, the technology that detects the coordinates of the two points is also used (see Japanese Laid-open Patent Publication No. 9-34625, Japanese Laid-open Patent Publication No. 2012-123787, see Japanese Laid-open Patent Publication No. 2011-76591 and Japanese Laid-open Patent Publication No. 2012-94003).

SUMMARY

According to an aspect of the present invention, there is provided a touch panel, including: a first resistance film; a second resistance film that is spaced apart from the first resistance film, and is opposite to the first resistance film; a first electrode and a second electrode that are provided on the first resistance film, and are opposite to each other in a first direction; a third electrode and a fourth electrode that are provided on the second resistance film, and are opposite to each other in a second direction that intersects with the first direction; an application unit that applies voltages to the first to the fourth electrodes, respectively; and a coordinate detection unit that, when the first resistance film comes in contact with the second resistance film at two points, detects coordinates of the two points based on a voltage applied between the first electrode and the second electrode, a voltage applied between the third electrode and the fourth electrode, and a voltage caused by a contact resistance between the first resistance film and the second resistance film.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-mentioned conventional touch panel, it may be difficult to detect the coordinates of the two points correctly. For example, a difference occurs in the detected coordinates in a case where the touch panel is operated with the pen and in a case where the touch panel is operated with the finger.

A description will now be given of embodiment of the present invention with reference to the drawings.

Figure 1A:
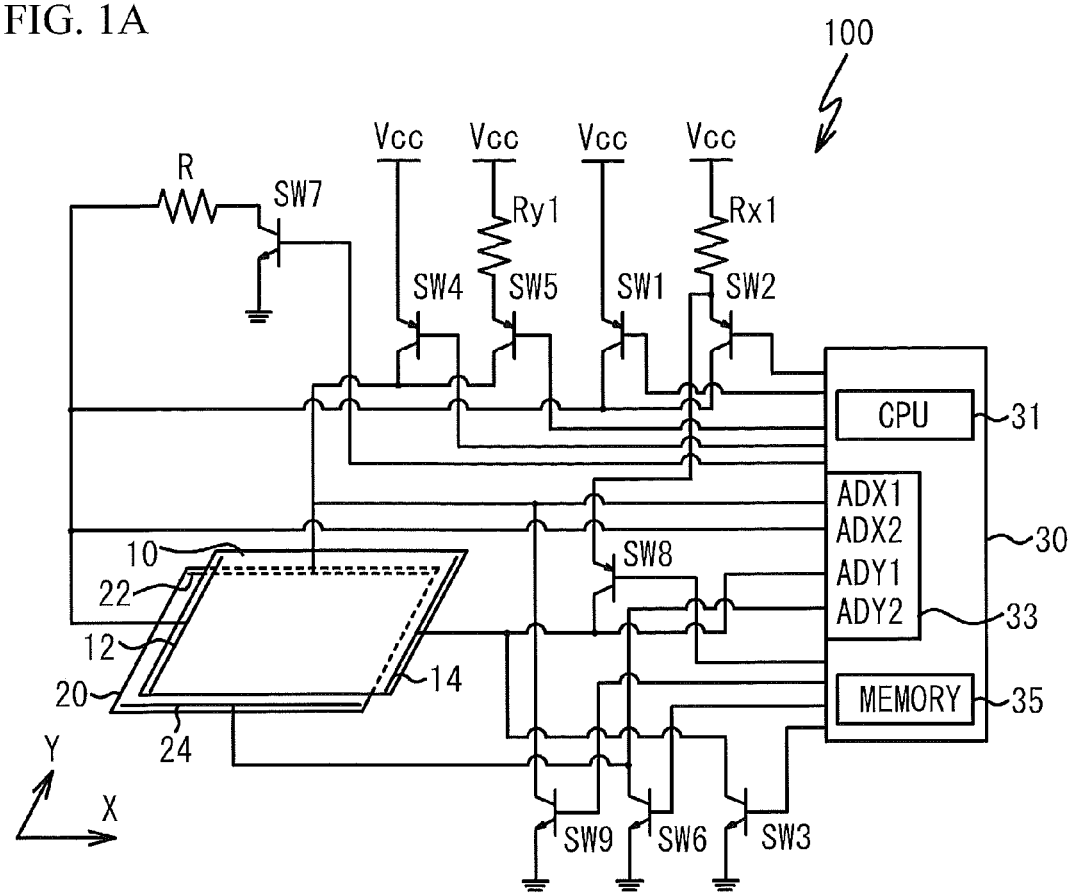
FIG. 1A is a block diagram illustrating a touch panel according to a first embodiment.

(FIRST EMBODIMENT) FIG. 1A is a block diagram illustrating a touch panel 100 according to a first embodiment. As illustrated in FIG. 1A, the touch panel 100 includes two resistance films 10 and 20, and a controller 30. The two resistance films 10 and 20 are opposite to each other, and overlap with a display device (not illustrated) such as a liquid crystal display. An XH electrode 12 (as an example of a first electrode) is provided on one side of the resistance film 10 (as an example of a first resistance film), and an XL electrode 14 (as an example of a second electrode) which is opposite to the XH electrode 12 is provided on another one side. A YH electrode 22 (as an example of a third electrode) is provided on one side of the resistance film 20 (as an example of a second resistance film), and a YL electrode 24 (as an example of a fourth electrode) which is opposite to the YH electrode 22 is provided on another one side. A direction (i.e., an X axis direction) in which the XH electrode 12 and the XL electrode 14 are opposite to each other intersects e.g. intersects perpendicularly a direction (i.e., a Y axis direction) in which the YH electrode 22 and the YL electrode 24 are opposite to each other.

The resistance films 10 and 20 are transparent conducting layers formed by ITO (Indium Tin Oxide). The resistance films 10 and 20 are formed by the same material, for example, and the electrical resistance is distributed approximately uniformly. The XH electrode 12, the XL electrode 14, the YH electrode 22 and the YL electrode 24 are made from metal, such as copper (Cu) or aluminum (Al).

Switches SW1 to SW8 are made of transistors. A base of a transistor of each switch is connected to the controller 30. Emitters of the switches SW1 and SW4 are connected to a power supply voltage Vcc. An emitter of the switch SW2 is connected to the power supply voltage Vcc via a resistance Rx1 and further connected to an emitter of the switch SW8. An emitter of the switch SW5 is connected to the power supply voltage Vcc via a resistance Ry1. Emitters of the switches SW3, SW6 and SW9 are grounded. The power supply voltage Vcc is 5V, for example.

The XH electrode 12 is connected to collectors of the switches SW1 and SW2, and connected to a collector of the switch SW7 via a resistance R. The XL electrode 14 is connected to collectors of the switches SW3 and SW8. The YH electrode 22 is connected to collectors of the switches SW4, SW5 and SW9. The YL electrode 24 is connected to a collector of the switch SW6.

The controller 30 includes a CPU (Central Processing Unit) 31, an AD (Analog-Digital) converter 33, a memory 35, and the like. The AD converter 33 includes voltage detectors ADX1, ADX2, ADY1 and ADY2. The voltage detector ADX1 is connected to the XH electrode 12. The voltage detector ADX2 is connected to the XL electrode 14. The voltage detector ADY1 is connected to the YH electrode 22. The voltage detector ADY2 is connected to the YL electrode 24. The memory 35 stores voltages Vx0, Vy0, and V1 to V11 described later.

The electrical resistance of the resistance Rx1 is larger than the electrical resistance of the resistance film 10 between the XH electrode 12 and the XL electrode 14. The electrical resistance of the resistance Ry1 is larger than the electrical resistance of the resistance film 20 between the YH electrode 22 and the YL electrode 24. The electrical resistance of the resistances Rx1 and Ry1 is large to such an extent that a current which flows through the resistance films 10 and 20 turns into constant current mostly.

Figure 1B:
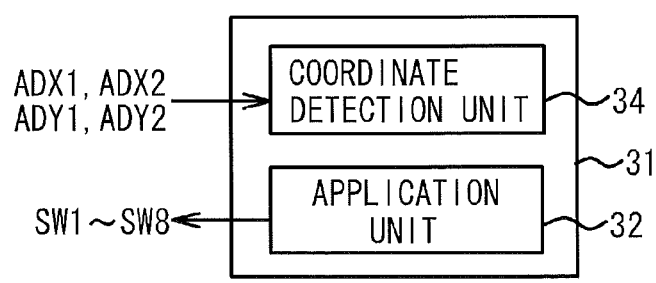
FIG. 1B is a functional block diagram illustrating a controller.

FIG. 1B is a functional block diagram illustrating the controller 30. The CPU 31 of the controller 30 functions as an application unit 32 and a coordinate detection unit 34. The application unit 32 controls the voltage application to the electrodes by applying the voltage to the switches and controlling ON/OFF of the switches. The coordinate detection unit 34 acquires voltages detected by the voltage detectors ADX1, ADX2, ADY1 and ADY2, and detects the coordinates of contact points based on the acquired voltages.

The voltage detectors ADX1 may be simply described as "ADX1". Other voltage detectors may also be described in the same manner as this.

The touch panel 100 calculates a distance between two points based on differences between reference voltages and voltages detected at the time of two-point touch. The touch panel 100 calculates the coordinates of the two points from the distance between the two points. A detailed description thereof will be mentioned later.

A description will be given of the two-point touch. The two-point touch is that pens or fingers touch the resistance film in different two points at about the same time. As described below, a difference occurs between the coordinates detected by the touch with the pens and coordinates detected by the touch with the fingers. Here, it is assumed that the power supply voltage Vcc is connected to the XH electrode 12 and the XL electrode 14 is grounded.

Figure 2A:
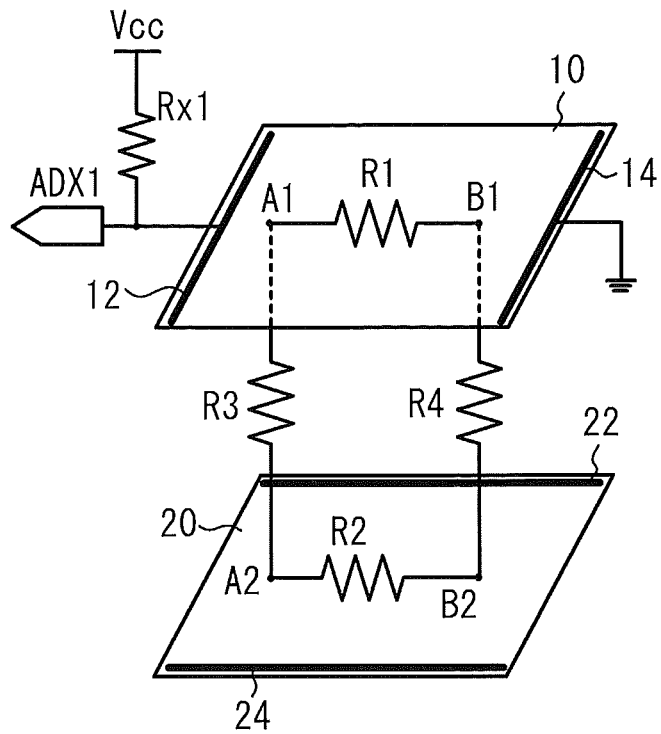
FIG. 2A is a perspective view illustrating the touch panel at the time of two-point touch by pens.

FIG. 2A is a perspective view illustrating the touch panel at the time of the two-point touch by the pens. When a point A1 in the resistance film 10 is depressed, the point A1 comes in contact with a point A2 in the resistance film 20. When a point B1 in the resistance film 10 is depressed, the point B1 comes in contact with a point B2 in the resistance film 20. The power supply voltage Vcc is voltage-divided by the resistance Rx1, and the resistances in the resistance films 10 and 20. Moreover, contact resistances R3 and R4 are generated at contact points of the resistance films 10 and 20. The contact resistances R3 and R4 are connected in parallel between the resistances R1 and R2.

Figure 2B:
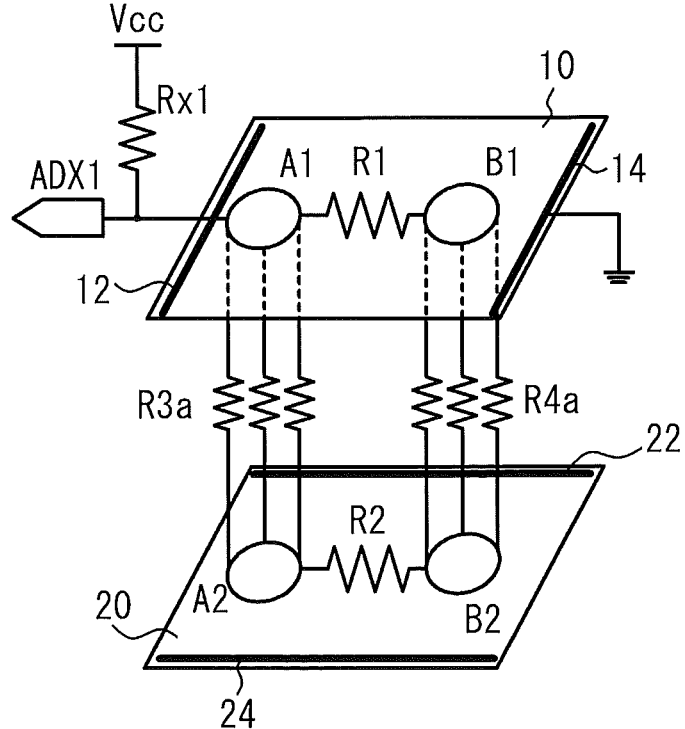
FIG. 2B is a perspective view illustrating the touch panel at the time of two-point touch by fingers.

FIG. 2B is a perspective view illustrating the touch panel at the time of the two-point touch by the fingers. The fingers are thicker than the pens. Therefore, the areas of the contact points of FIG. 2B are larger than those of FIG. 2A. Since the areas become large, it can be considered that a plurality of contact resistances $R3_a$ (a=1 to n) occur in the contact points A1 and A2 and a plurality of contact resistances $R4_a$ (a=1 to n) occur in the contact points B1 and B2. A contact resistance R5 in the contact points A1 and A2 is denoted by a formula 1, and a contact resistance R6 in the contact points B1 and B2 is denoted by a formula 2.

$$R5 = \frac{1}{\frac{1}{R3_1} + \frac{1}{R3_2} + \ldots + \frac{1}{R3_n}} \quad \text{[formula 1]}$$

$$R6 = \frac{1}{\frac{1}{R4_1} + \frac{1}{R4_2} + \ldots + \frac{1}{R4_n}} \quad \text{[formula 2]}$$

Where the contact resistance R5 is smaller than the contact resistances R3 (R5<R3), the contact resistance R6 is smaller than the contact resistances R4 (R6<R4). That is, the contact resistances at the time of the touch by the fingers (finger touch) are smaller than the contact resistances at the time of the touch by the pens (pen touch). When the contact resistances become small, the voltage which the ADX1 detects becomes small. When the detected voltage becomes small, a difference between the reference voltage and the detected voltage becomes large, and hence the distance between the two points to be calculated also becomes large. That is, the distance at the time of the finger touch becomes larger than the distance at the time of the pen touch. As a result, the differences occur between the coordinates at the time of the finger touch and the coordinates at the time of the pen touch. Even when a user touches the two points which have been touched with the pens, with the fingers, the differences occur in the detected coordinates. Therefore, malfunction of the touch panel occurs. Moreover, since the contact areas are changed by also a pressure force, the sizes of the pens and the fingers, directions of the pens and the fingers, and so on, it becomes difficult to detect the coordinates correctly.

By connecting probes to the contact points, the voltages which occur in the contact points can be detected. Therefore, the probes are connected to both ends of the resistance R3 and both ends of the resistance R4 of FIG. 2A. However, when the probes are provided in the resistance film 10 and 20, a function as the touch panel is spoiled and the visibility of a screen also decreases. Thus, since it is difficult to provide the probes, it is difficult to eliminate the influence of the contact resistances by using the probes. In the first embodiment, by calculating the voltages generated by the contact resistances, the coordinate detection with high accuracy which eliminated the influence of the contact resistances is performed. A description will be given of processes of the touch panel 100.

Figure 3:
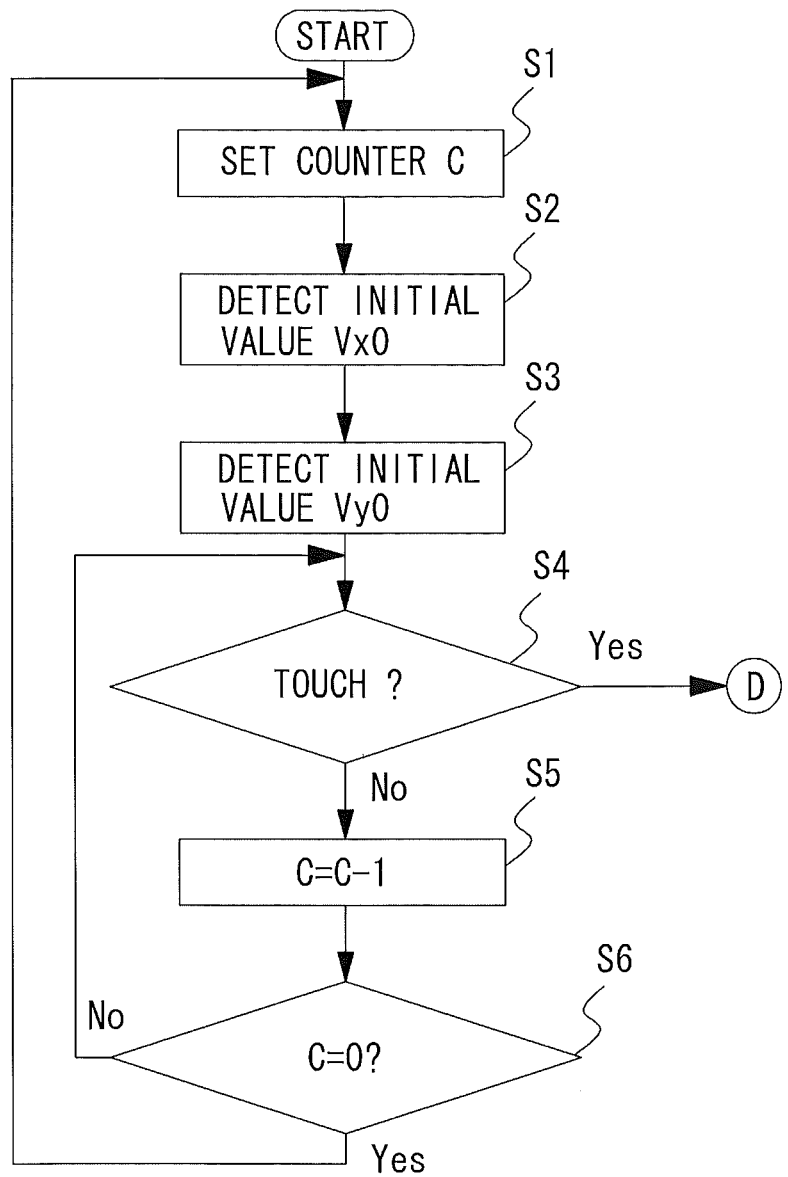
FIG. 3 is a flowchart illustrating a coordinate detection process of the touch panel.
Figure 4:
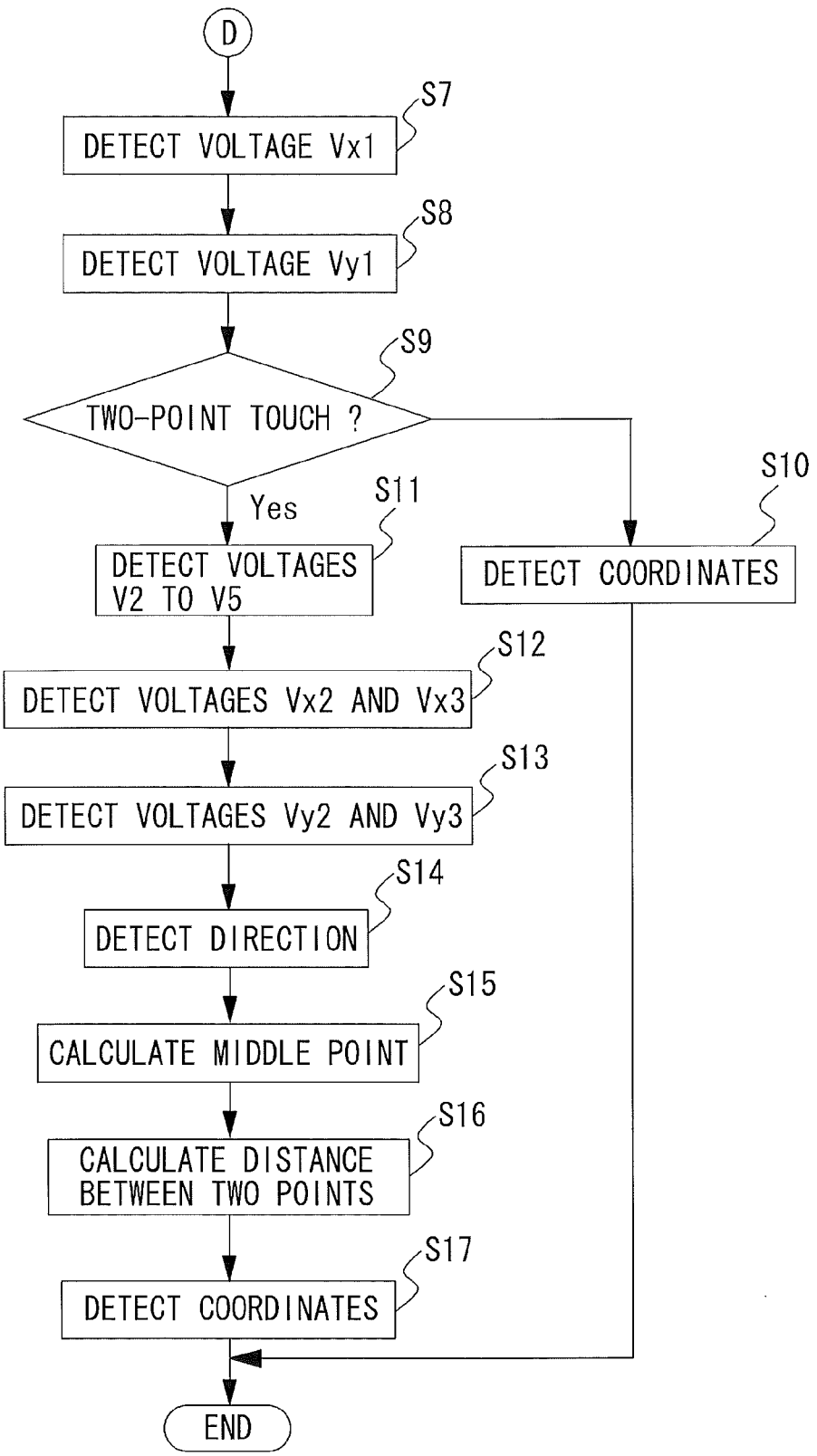
FIG. 4 is a flowchart illustrating the coordinate detection process of the touch panel.

FIGS. 3 and 4 are flowchart illustrating a coordinate detection process of the touch panel 100. A detailed description with respect to steps S3, S4, S7 to S9, and S11 to S17 is mentioned later, with reference to the drawings.

As illustrated in FIG. 3, the controller 30 sets a counter C to 1000 msec, for example (step S1). The ADX1 detects an initial value Vx0 of the voltage in the X-axis direction (step S2). The Initial value Vx0 becomes the reference voltage for calculating the distance between the two points in the X-axis direction. The ADY1 detects an initial value Vy0 of the voltage in the Y-axis direction (step S3). The Initial value Vy0 becomes the reference voltage for calculating the distance between the two points in the Y-axis direction. The controller 30 stores the initial values Vx0 and Vy0 into the memory 35. The controller 30 determines whether the touch is performed (step S4). The determination of the touch is performed based on detection of the voltage by the ADX1, ADX2, ADY1, and ADY2.

When the answer to the determination of step S4 is NO, the controller 30 decrements the counter C by 1 (step S5), and determines whether the counter C is "0" (step S6). When the answer to the determination of step S6 is NO, step S4 is performed. When the answer to the determination of step S6 is YES, step S1 is performed and the counter C is set again.

When the answer to the determination of step S4 is YES, the process proceed to step S7 (see FIGS. 3 and 4). As illustrated in FIG. 4, the ADX1 detects the voltage Vx1 in the X-axis direction, and the ADY1 detects the voltage Vy1 in the Y-axis direction (steps S7 and S8). The controller 30 stores the voltages Vx1 and Vy1 into the memory 35. The controller 30 determines whether the two-point touch is performed (step S9). The determination is performed by the comparison between the initial value Vx0 and the voltage Vx1, and the comparison between the initial value Vy0 and the voltage Vy1.

Figure 6A:
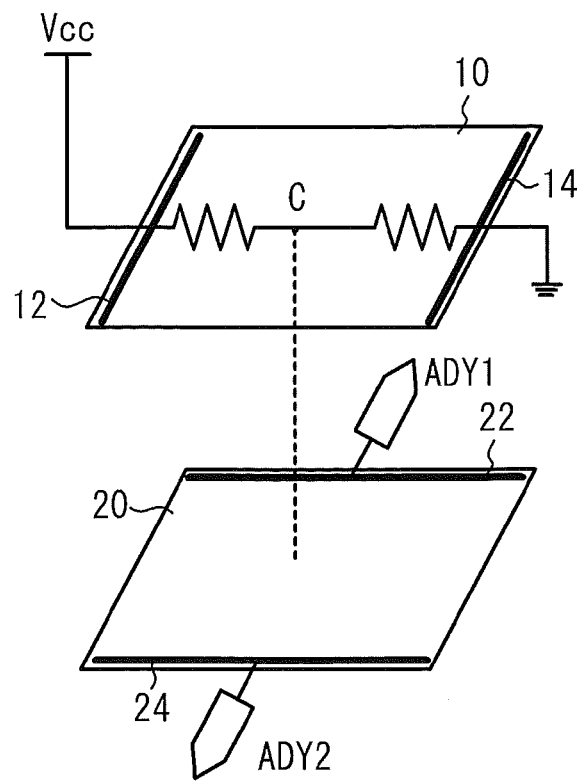
FIGS. 6A and 6B are perspective views illustrating the touch panel in touch determination.
Figure 6B:
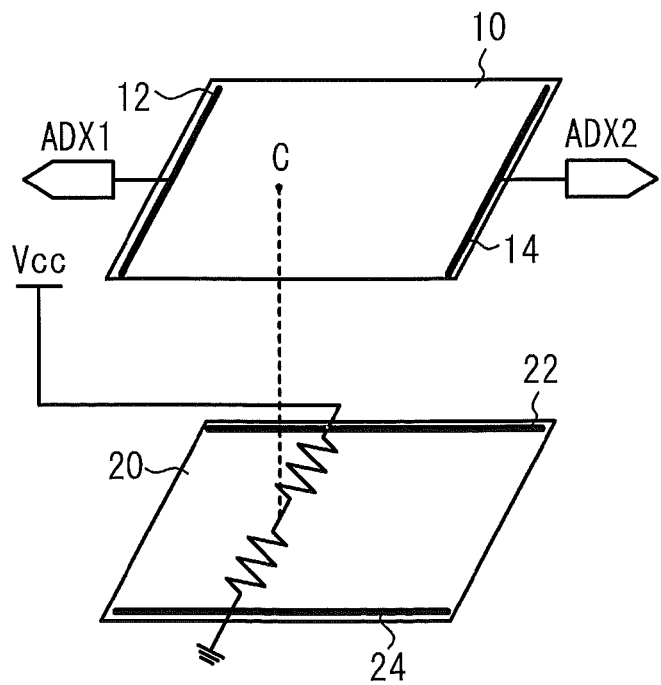

When the answer to the determination of step S9 is NO, the coordinate detection unit 34 detects coordinates of one touched point (step S10). In order to detect an X-coordinate, the application unit 32 applies a voltage in the X-axis direction, and the ADY1 detects the voltage, as illustrated in FIG. 6A described later. The voltage drop by a resistance component of the resistance film 10 occurs according to a distance from the XH electrode 12 to a point C of FIG. 6A. The coordinate detection unit 34 detects the X-coordinate based on the voltage detected by the ADY1. The application unit 32 applies a voltage in the Y-axis direction, and the ADX1 detects the voltage, as illustrated in FIG. 6B described later. The coordinate detection unit 34 detects the Y-coordinate based on the voltage detected by the ADX1. After step S10, the process is terminated.

When the answer to the determination of step S9 is YES, the ADX1, the ADX2, the ADY1 and the ADY2 detect voltages V2 to V5 (step S11). The controller 30 stores the voltages V2 to V5 into the memory 35. In step S16, the voltages V2 to V5 are used to calculate voltages which occur by the contact resistances.

The ADY1 and the ADY2 detect voltages Vx2 and Vx3 in the X-axis direction (step S12). The ADX1 and the ADX2 detect voltages Vy2 and Vy3 in the Y-axis direction (step S13). The coordinate detection unit 34 detects a direction of a line coupling contact points A and B by using the voltage Vx0 to Vx3 and the voltage Vy0 to Vy3 (step S14). The coordinate detection unit 34 calculates a middle point of the two points (i.e., the contact points A and B) (step S15). The coordinate detection unit 34 detects an X-coordinate Xc of the middle point based on an average value of the voltages Vx2 and Vx3, and a Y-coordinate Yc of the middle point based on an average value of the voltages Vy2 and Vy3. The coordinate detection unit 34 calculates a distance between the two points (step S16). In the calculation of the distance, the coordinate detection unit 34 eliminates the influence of the contact resistances by calculating the voltages caused by the contact resistances by using the voltages V2 to V5 detected in step S11. Thereby, the distance between the two points can be calculated with sufficient accuracy. The coordinate detection unit 34 calculates the coordinates of the two point by using the distance and the coordinates Xc and Yc of the middle point (step S17). After step S17, the process is terminated.

Figure 5A:
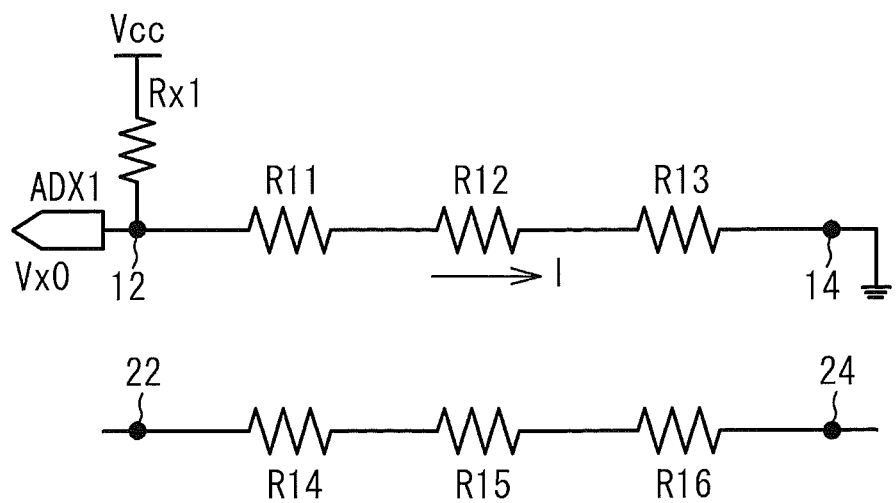
FIG. 5A is a circuit diagram illustrating an equivalent circuit for the detection of an initial value Vx0.

A description will be given of step S3 with reference to FIGS. 5A and 5B. In a non-touch state, the ADX1 and the ADY1 detect the initial values Vx0 and Vy0. FIG. 5A is a circuit diagram illustrating an equivalent circuit for the detection of the initial value Vx0. The electrodes are illustrated by black circles. As illustrated in FIG. 5A, the power supply voltage Vcc is connected to the XH electrode 12 via the resistance Rx1, and the XL electrode 14 is grounded. That is, the switches SW2 and SW3 in FIG. 1A are turned on, and another switches are turned off. In order to make the circuit of FIG. 5A correspond to FIGS. 7B and 8B mentioned later, it is assumed that resistances R11, R12 and R13 are connected in series between the XH electrode 12 and the XL electrode 14 for convenience. The resistances R11 to R13 correspond to the resistance components of the resistance film 10. In order to make the circuit of FIG. 5A correspond to FIGS. 7B and 8B mentioned later, it is assumed that resistances R14, R15 and R16 are connected in series between the YH electrode 22 and the YL electrode 14 for convenience. The resistances R14 to R16 correspond to the resistance components of the resistance film 20. The power supply voltage Vcc is voltage-divided by the resistance Rx1 and the resistance component between the XH electrode 12 and the XL electrode 14. A current I flows from the XH electrode 12 to the XL electrode 14. The ADX1 detects the voltage (i.e., the initial value) Vx0 between the XH electrode 12 and the XL electrode 14. The initial value Vx0 is denoted by a formula 3.

$$Vx0 = R11 \times I + R12 \times I + R13 \times I \qquad \text{[formula 3]}$$

Figure 5B:
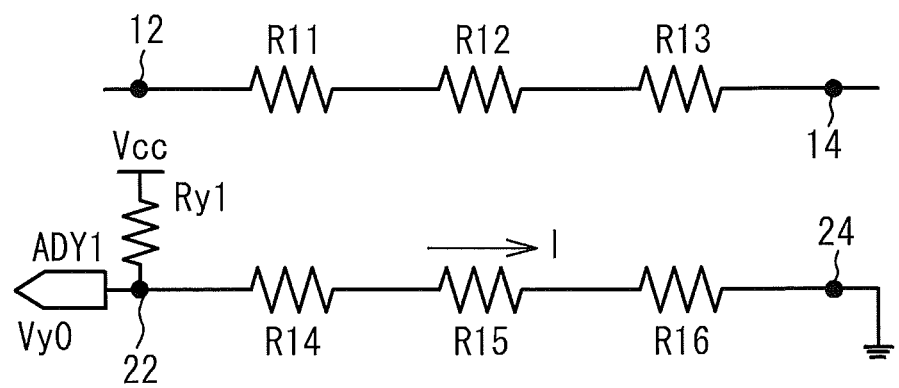
FIG. 5B is a circuit diagram illustrating an equivalent circuit for the detection of an initial value Vy0.

FIG. 5B is a circuit diagram illustrating an equivalent circuit for the detection of the initial value Vy0. As illustrated in FIG. 5B, the power supply voltage Vcc is connected to the YH electrode 22 via the resistance Ry1, and the YL electrode 24 is grounded. That is, the switches SW5 and SW6 of FIG. 1A are turned on, and another switches are turned off. The ADY1 detects the voltage (i.e., the initial value) Vy0 between the YH electrode 22 and the YL electrode 24. The initial value Vy0 is denoted by a formula 4.

$$Vy0=R14\times I+R15\times I+R16\times I \quad \text{[formula 4]}$$

Referring to FIGS. 6A and 6B, a description will be given of step S4. Hereinafter, the touch determination is explained as an example of the time of the one-point touch. FIGS. 6A and 6B are perspective views illustrating the touch panel in touch determination.

In an example of FIG. 6A, the power supply voltage Vcc is applied between the XH electrode 12 and the XL electrode 14. When the touch is performed at the point C of FIG. 6A, for example, a voltage is applied also to the resistance film 20. As a result, the ADY1 and the ADY2 detect the voltage. When the touch is not performed, the voltage is not applied to the resistance film 20, and hence the ADY1 and the ADY2 do not detect the voltage. Specifically, when the ADY1 and the ADY2 detect a voltage equal to or larger than a threshold value (e.g. 2.5 V), it is determined that the touch is performed (YES in step S4). When the ADY1 and the ADY2 do not detect the voltage equal to or larger than the threshold value (e.g. 2.5 V), it is determined that the touch is not performed (NO in step S4). Here, even when the two-point touch is performed, the touch can be determined by existence or nonexistence of the voltage detection of the ADY1 and the ADY2 as with the one-point touch. As illustrated in an example of FIG. 6B, the power supply voltage Vcc is applied between the YH electrode 22 and the YL electrode 24, the touch may be determined by whether the voltage detected by the ADX1 and the ADX2 is equal to or more than the threshold value. Here, as illustrated in FIGS. 6A and 6B, the power supply voltage Vcc may be applied without passing the resistances Rx1 and the Ry1.

Figure 7A:
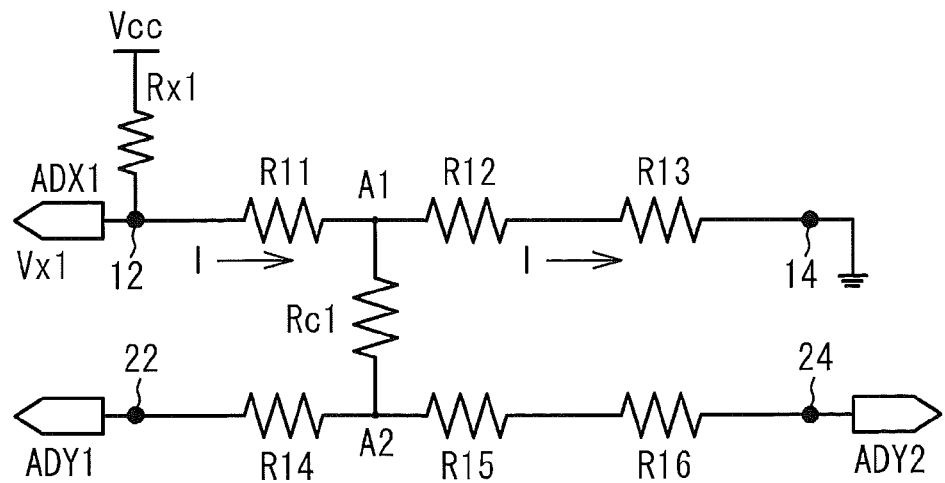
FIG. 7A is a circuit diagram illustrating an equivalent circuit at the time of one-point touch.
Figure 7B:
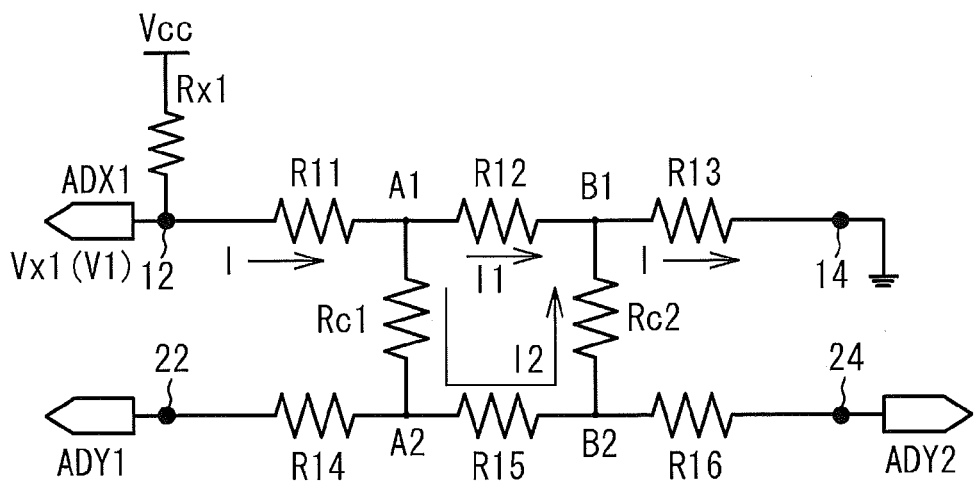
FIG. 7B is a circuit diagram illustrating an equivalent circuit at the time of two-point touch.
Figure 8A:
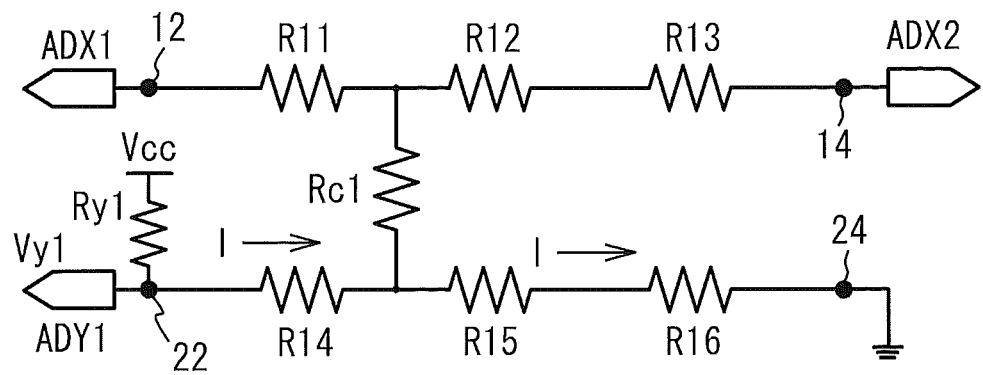
FIG. 8A is a circuit diagram illustrating an equivalent circuit at the time of one-point touch.
Figure 8B:
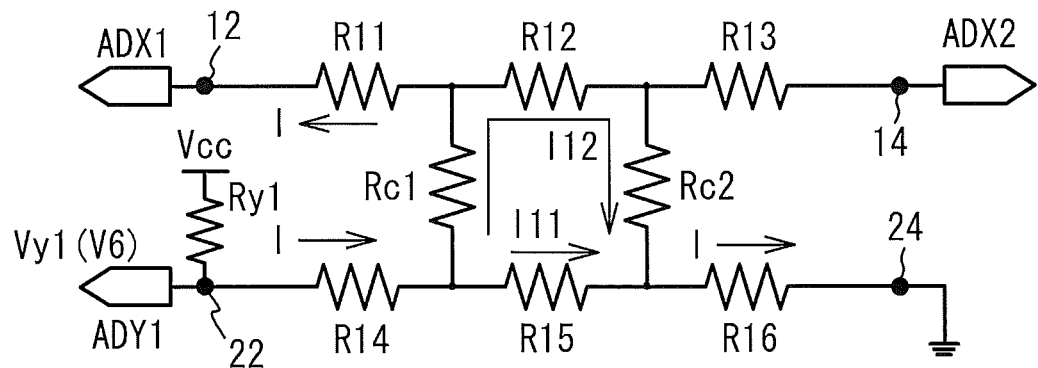
FIG. 8B is a circuit diagram illustrating an equivalent circuit at the time of two-point touch.

A description will be given of steps S7 and S8 with reference to FIG. 7A to 8B. In order to detect the voltage Vx1, the controllers 30 turns on the switches SW 2 and SW3 of FIG. 1A, and turns off another switches. FIG. 7A is a circuit diagram illustrating an equivalent circuit at the time of the one-point touch. FIG. 7B is a circuit diagram illustrating an equivalent circuit at the time of the two-point touch. As illustrated in FIGS. 7A and 7B, the power supply voltage Vcc is applied in the X-axis direction. The ADX1 detects the voltage Vx1 between the XH electrode 12 and the XL electrode 14 (step S7). In order to detect the voltage Vy1, the controller 30 turns on the switches SW5 and SW6, and turns off another switches. FIG. 8A is a circuit diagram illustrating an equivalent circuit at the time of the one-point touch. FIG. 8B is a circuit diagram illustrating an equivalent circuit at the time of the two-point touch. As illustrated in FIGS. 8A and 8B, the power supply voltage Vcc is applied in the Y-axis direction. The ADY1 detects the voltage Vy1 between the YH electrode 22 and the YL electrode 24 (step S8).

A description will be given of step S9 with reference to FIG. 7A to 8B. As illustrated in FIG. 7A, the point A1 of the resistance film 10 comes in contact with the point A2 of the resistance film 20. The voltage Vx1 which the ADX1 detects becomes at the same level as the initial value Vx0.

As illustrated in FIG. 7B, the point A1 of the resistance film 10 comes in contact with the point A2 of the resistance film 20, and the point B1 comes in contact with the point B2. The resistance R11 corresponds to the resistance component of the resistance film 10 between the XH electrode 12 and the point A1. The resistance R12 corresponds to the resistance component of the resistance film 10 between the point A1 and the point B1. The resistance R13 corresponds to the resistance component of the resistance film 10 between the point B1 and the XL electrode 14. The resistance R14 corresponds to the resistance component of the resistance film 20 between the YH electrode 22 and the point A2. The resistance R15 corresponds to the resistance component of the resistance film 20 between the point A2 and the point B2. The resistance R16 corresponds to the resistance component of the resistance film 20 between the point B2 and the YL electrode 24.

As illustrated in FIG. 7B, the contact resistance Rc1 occurs between the points A1 and A2, and the contact resistance Rc2 occurs between the points B1 and B2. As illustrated in FIG. 7B, a resistance between the XH electrode 12 and the XL electrode 14 at the time of the two-point touch becomes a resistance in which the resistance R15 and the contact resistances Rc1 and Rc2 have been connected in parallel. Therefore, the resistance between the XH electrode 12 and the XL electrode 14 at the time of the two-point touch becomes lower than the resistance (R11+R12+R13) at the time of the one-point touch. Since the resistance between the XH electrode 12 and the XL electrode 14 becomes low, the voltage Vx1 which the ADX1 detects becomes smaller than the initial value Vx0 at the time of the two-point touch. Here, the voltage Vx1 at the time of the two-point touch may be simply written as "V1". Moreover, currents in FIG. 7B are mentioned later.

The voltage Vy1 which the ADY1 detects at the time of the one-point touch illustrated in FIG. 8A becomes at the same level as the initial value Vy0. As illustrated in FIG. 8B, a resistance between the YH electrode 22 and the YL electrode 24 at the time of the two-point touch becomes a resistance in which the resistance R12 and the contact resistances Rc1, and Rc2 have been connected in parallel. Therefore, the resistance between the YH electrode 22 and the YL electrode 24 at the time of the two-point touch becomes lower than the resistance at the time of the one-point touch. Since the resistance between the YH electrode 22 and the YL electrode 24 becomes low, the voltage Vy1 which the ADY1 detects becomes smaller than the initial value Vy0 at the time of the two-point touch. Here, the voltage Vy1 at the time of the two-point touch may be simply written as "V6".

As described above, when the voltage Vx1 is equal to the initial value Vx0 or within the limits of an error of the initial value Vx0 and the voltage Vy1 is equal to the initial value Vy0 or within the limits of an error of the initial value Vy0, the controller 30 determines that the touch panel 100 has been touched in one point (NO in step S9). When the voltage Vx1 is smaller than the initial value Vx0 or the voltage Vy1 is smaller than the initial value Vy0, the controller 30 determines that the touch panel 100 has been touched in two points (YES in step S9).

Figure 11A:
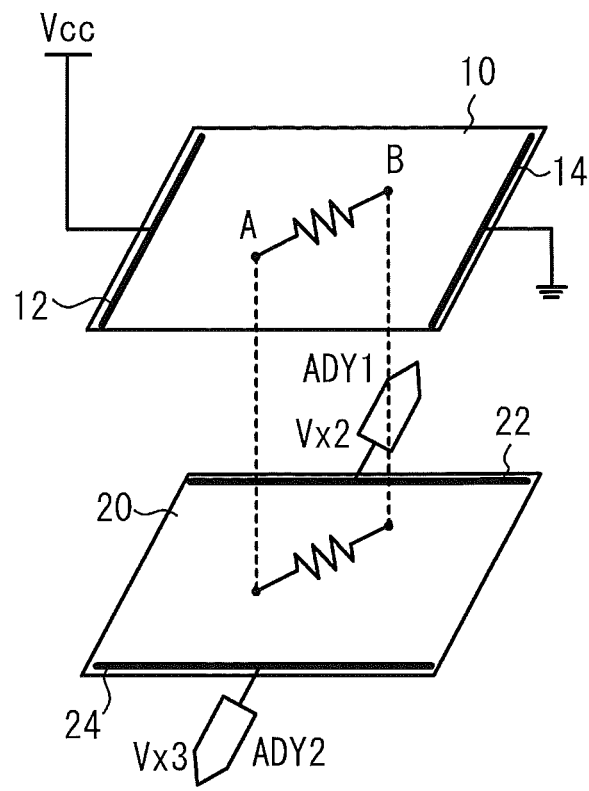
FIGS. 11A and 11B are perspective view illustrating the detection of voltages Vx2 and Vx.
Figure 11B:
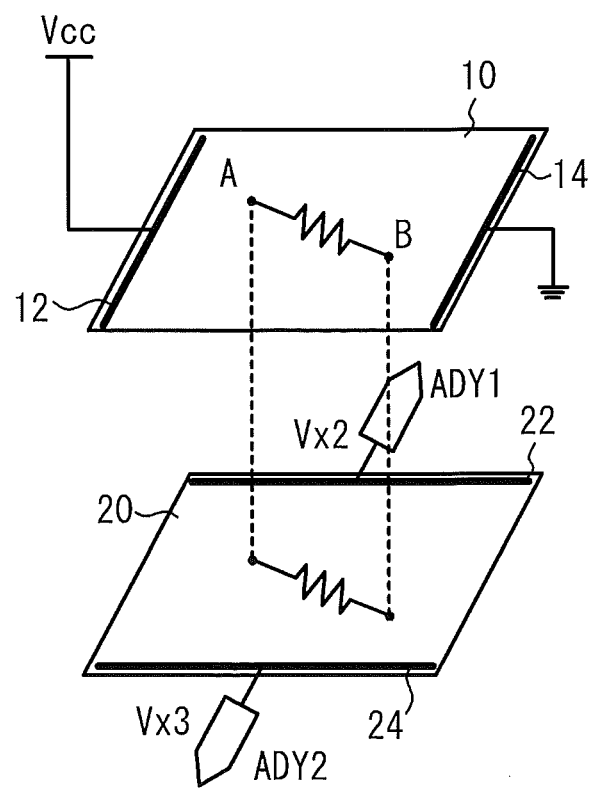

A description will be given of steps S12 and S13 with reference to FIGS. 11A to 12B. FIGS. 11A and 11B are perspective view illustrating the detection of voltages Vx2 and Vx3, and illustrate an example in which the touch is performed in two points. In FIG. 11A, the point B is closer to the XL electrode 14 and the YH electrode 22 than the point A. An inclination from the point A to the point B is an upward inclination to the right. In FIG. 11B, the point A is closer to the XH electrode 12 and the YH electrode 22 than the point B. An inclination from the point A to the point B is a downward inclination to the right. As illustrated in FIGS. 11A and 11B, the power supply voltage Vcc is connected to the XH electrode 12, and the XL electrode 14 is grounded.

The ADY1 detects the voltage Vx2 and the ADY2 detects the voltage Vx3. Here, the power supply voltage Vcc is applied without passing the resistances Rx1 and the Ry1.

Figure 12A:
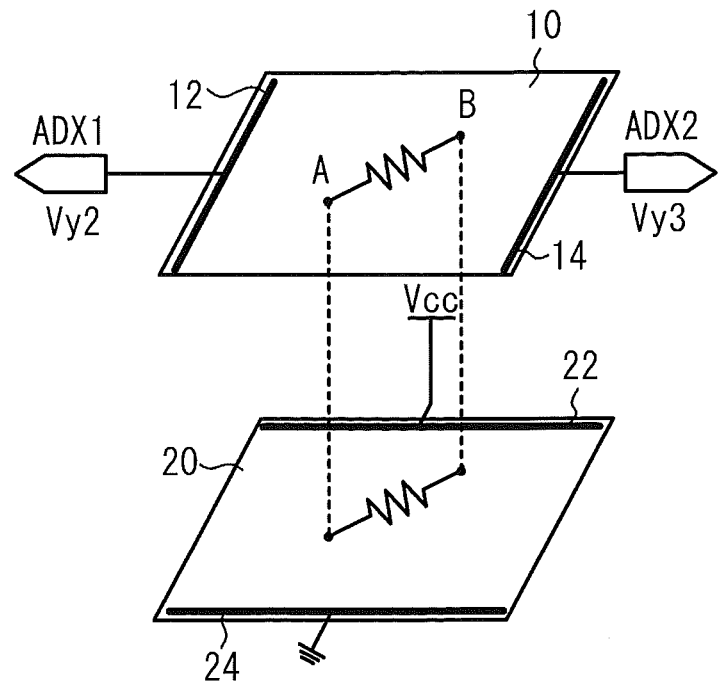
FIGS. 12A and 12B are perspective view illustrating the detection of voltages Vy2 and Vy3.
Figure 12B:
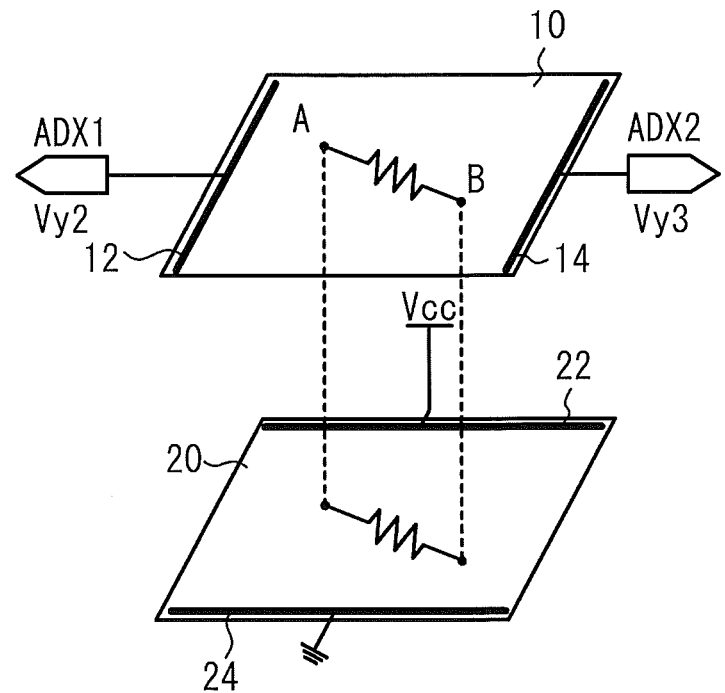

FIGS. 12A and 12B are perspective view illustrating the detection of the voltage Vy2 and Vy3. In FIG. 12A, the point B is closer to the XL electrode 14 and the YH electrode 22 than the point A. In FIG. 12B, the point A is closer to the XH electrode 12 and the YH electrode 22 than the point B. As illustrated in FIGS. 12A and 12B, the power supply voltage Vcc is connected to the YH electrode 22, and the YL electrode 24 is grounded. The ADX1 detects the voltage Vy2, and the ADX2 detects the voltage Vy3. As described above, the X-coordinate Xc of the middle point is calculated based on the average value of the voltages Vx2 and Vx3, the Y-coordinate Yc of the middle point is calculated based on the average value of the voltages Vy2 and Vy3 (step S15).

A description will be given of step S14. When the voltage Vx1 is lower than the initial value Vx0, and the voltage Vy1 is approximately equal to the initial value Vy0 (i.e., the voltage Vy1 is equal to the initial value Vy0 or within the limits of an error of the initial value Vy0), the coordinate detection unit 34 determines that a line segment coupling the two points A and B is in parallel with the X-axis direction (i.e., the line segment is perpendicular to the Y-axis direction). When the two points A and B are arranged in the X-axis direction, the decrease of the resistance by the resistances Rc1, Rc2 and R15 as illustrated in FIG. 7B and the decrease of the voltage occur in the X-axis direction. Therefore, the voltage Vx1 becomes lower than the initial value Vx0. On the contrary, since the decrease of the resistance and the voltage does not occur in the Y-axis direction, the voltage Vy1 is approximately equal to the initial value Vy0.

When the voltage Vx1 is approximately equal to the initial value Vx0, and the voltage Vy1 is lower than the initial value Vy0, the coordinate detection unit 34 determines that the line segment coupling the two points A and B is in parallel with the Y-axis direction (i.e., the line segment is perpendicular to the X-axis direction). When the two points A and B are arranged in the Y-axis direction, the decrease of the resistance by the resistances Rc1, Rc2 and R12 as illustrated in FIG. 8B and the decrease of the voltage occur in the Y-axis direction. Therefore, the voltage Vy1 becomes lower than the initial value Vy0. When the voltage Vx1 is lower than the initial value Vx0 and the voltage Vy1 is lower than the initial value Vy0, the coordinate detection unit 34 determines that the line segment coupling the two points A and B inclines against the X-axis direction and the Y-axis direction.

When the line segment coupling the two points A and B inclines against the X-axis direction and the Y-axis direction, the coordinate detection unit 34 detects the inclination between the two points by using the voltages Vx2, Vx3, Vy2 and Vy3.

When the voltage Vx3 is higher than the voltage Vx2, the coordinate detection unit 34 detects the inclination is an upward inclination to the right, as illustrated in FIG. 11A. In an example of FIG. 11A, the point A is closer to the XH electrode 12 connected to the power supply voltage Vcc than the point B, and hence the point A has a voltage higher than the point B. Since the ADY2 is connected to the YH electrode 22 close to the point A, the voltage Vx3 which the ADY2 detects becomes higher than the voltage Vx2 which the ADY1 detects.

When the voltage Vx2 is higher than the voltage Vx3, the coordinate detection unit 34 detects the inclination is a downward inclination to the right, as illustrated in FIG. 11B. In an example of FIG. 11B, the point A is closer to the XH electrode 12 connected to the power supply voltage Vcc than the point B, and hence the point A has a voltage higher than the point B. Since the ADY1 is connected to the YH electrode 22 close to the point A, the voltage Vx2 which the ADY1 detects becomes higher than the voltage Vx3 which the ADY2 detects. As described above, the power supply voltage Vcc is applied in the X-axis direction, and the ADY1 and the ADY2 detects the voltages, so that the inclination between the two points can be detected. Here, the inclination can be also detected by using the voltages Vy2 and Vy3. When the voltage Vy3 is higher than the voltage Vy2, the point B is closer to the XL electrode 14 and the YH electrode 22 than the point A, as illustrated in FIG. 12A. When the voltage Vy2 is higher than the voltage Vy3, the point A is closer to the XH electrode 12 and the YH electrode 22 than the point B, as illustrated in FIG. 12B.

A description will be given of steps S11, S16 and S17 with reference to FIGS. 7B, 8B, and 9A to 10B.

When the two-point touch is performed and a voltage is applied between the XH electrode 12 and the XL electrode 14, a current I flows from the XH electrode 12 to the XL electrode 14. Moreover, divided currents I1 and I2 of the current I flow between the points A1 and B1. When a path including the resistance R12 of FIG. 7B is noted, the voltage V1 to be applied from the XH electrode 12 to the XL electrode 14 is denoted by a formula 5.

$$V1 = R11 \times I + R12 \times I1 + R13 \times I \quad \text{[formula 5]}$$

As illustrated in FIG. 7B, the current I and the divided currents I1 and I2 have a relationship denoted by a formula 6.

$$I = I1 + I2 \quad \text{[formula 6]}$$

The divided currents I1 and I2 are denoted by formulas 7 and 8, respectively.

$$I1 = \frac{R15 + Rc1 + Rc2}{R12 + R15 + Rc1 + Rc2} I \quad \text{[formula 7]}$$

$$I2 = \frac{R12}{R12 + R15 + Rc1 + Rc2} I \quad \text{[formula 8]}$$

The distance between the points A1 and B1 is equal to a distance between the points A2 and B2. The distribution of the electrical resistance of the resistance film 10 is approximately equal to the distribution of the electrical resistance of the resistance film 20. Therefore, a formula 9 is satisfied. Where the "Rd" is a constant number.

$$R12 = R15 = Rd \quad \text{[formula 9]}$$

When the formula 9 is substituted for the formulas 5, 7 and 8, the formulas 5, 7 and 8 are denoted by the formulas 10-12, respectively.

$$V1 = R11 \times I + Rd \times I1 + R13 \times I \quad \text{[formula 10]}$$

$$I1 = \frac{Rd + Rc1 + Rc2}{2Rd + Rc1 + Rc2} I \quad \text{[formula 11]}$$

$$I2 = \frac{Rd}{2Rd + Rc1 + Rc2} I \quad \text{[formula 12]}$$

A difference ΔVx1 between the initial value Vx0 denoted by the formula 3 and the voltage V1 denoted by the formula 10 is denoted by a formula 13.

$$\Delta V \times 1 = V \times 0 - V1 \quad \text{[formula 13]}$$
$$= R12 \times I - R12 \times I1 = R12 \times I2$$
$$= \frac{Rd^2}{2Rd + Rc1 + Rc2}I$$

When the path including the resistances R15, Rc1, and Rc2 of FIG. 7B is noted, the voltage V1 is denoted by a formula 14.

$$V1 = R11 \times I + (R15 + Rc1 + Rc2) \times I2 + R13 \times I \quad \text{[formula 14]}$$

Based on the formulas 14 and 3, the difference $\Delta Vx1$ is denoted by a formula 15.

$$\Delta Vx1 = Rd \times I - (Rd + Rc1 + Rc2) \times I2 \quad \text{[formula 15]}$$

A formula 16 is drawn from the formulas 12, 13 and 15.

$$(Rc1 + Rc2) \times I2 = Rd \times I - Rd \times \frac{Rd}{2Rd + Rc1 + Rc2}I - \quad \text{[formula 16]}$$
$$\Delta V \times 1$$
$$= \frac{Rd(Rc1 + Rc2)}{2Rd + Rc1 + Rc2}I$$

The formula 16 denotes a voltage $(Rc1+Rc2) \times I2$ which is caused by the contact resistances Rc1 and Rc2. In order to detect correct coordinates, the influence of the contact resistances Rc1 and Rc2 is eliminated from the difference $\Delta Vx1$. That is, the voltage denoted by the formula 16 is eliminated from the difference $\Delta Vx1$. In order to calculate the formula 16, a direction in which the voltage is applied is changed and the voltages V2 to V5 are detected.

Figure 9A:
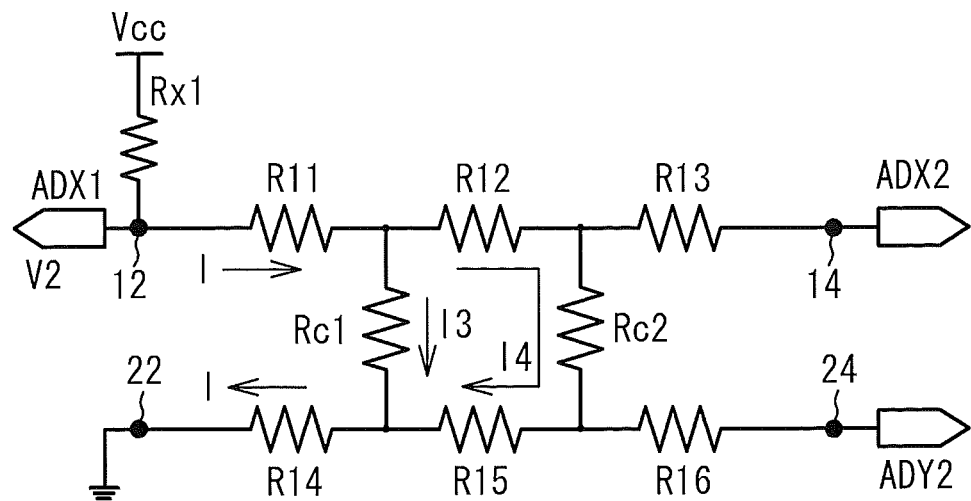
FIG. 9A is a circuit diagram illustrating an example in which a voltage is applied from an XH electrode to a YH electrode.

FIG. 9A is a circuit diagram illustrating an example in which a voltage is applied from the XH electrode 12 to the YH electrode 22. The power supply voltage Vcc is connected to the XH electrode 12, and the YH electrode 22 is grounded. The current I flows from the XH electrode 12 to the YH electrode 22. The ADX1 detects the voltage V2. When a path including the contact resistance Rc1 is noted, the voltage V2 to be applied from the XH electrode 12 to the YH electrode 22 is denoted by a formula 17.

$$V2 = R11 \times I + Rc1 \times I3 + R14 \times I \quad \text{[formula 17]}$$

By using the formula 9, divided currents I3 and I4 are denoted by formulas 18 and 19, respectively.

$$I3 = \frac{R12 + R15 + Rc2}{R12 + R15 + Rc1 + Rc2}I = \frac{2Rd + Rc2}{2Rd + Rc1 + Rc2}I \quad \text{[formula 18]}$$

$$I4 = \frac{Rc1}{R12 + R15 + Rc1 + Rc2}I = \frac{Rc1}{2Rd + Rc1 + Rc2}I \quad \text{[formula 19]}$$

Figure 9B:
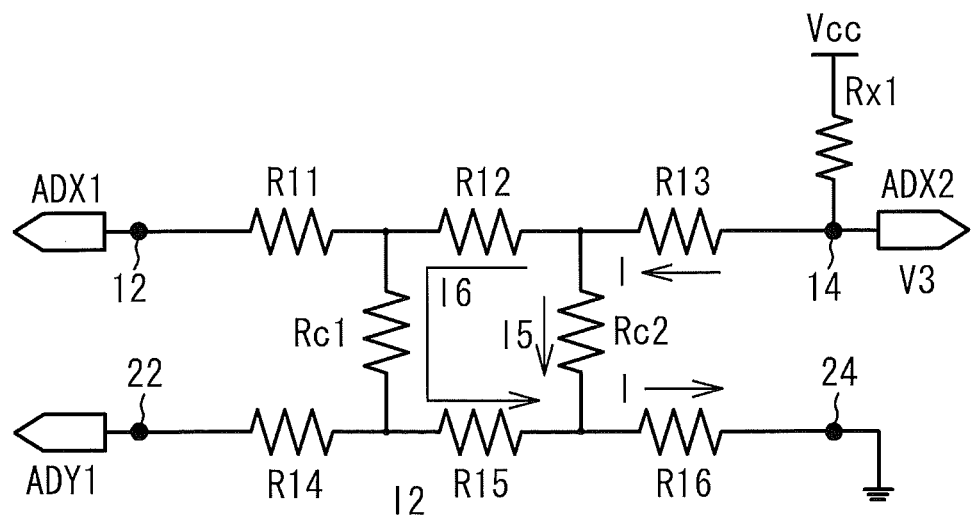
FIG. 9B is a circuit diagram illustrating an example in which a voltage is applied from an XL electrode to a YL electrode.

FIG. 9B is a circuit diagram illustrating an example in which a voltage is applied from the XL electrode 14 to the YL electrode 24. When a path including the contact resistance Rc2 is noted, the voltage V3 to be applied from the XL electrode 14 to the YL electrode 24 is denoted by a formula 20.

$$V3 = R13 \times I + Rc2 \times I5 + R16 \times I \quad \text{[formula 20]}$$

By using the formula 9, divided currents I5 and I6 are denoted by formulas 21 and 22, respectively.

$$I5 = \frac{R12 + R15 + Rc1}{R12 + R15 + Rc1 + Rc2}I = \frac{2Rd + Rc1}{2Rd + Rc1 + Rc2}I \quad \text{[formula 21]}$$

$$I6 = \frac{Rc2}{R12 + R15 + Rc1 + Rc2}I = \frac{Rc2}{2Rd + Rc1 + Rc2}I \quad \text{[formula 22]}$$

Figure 10A:
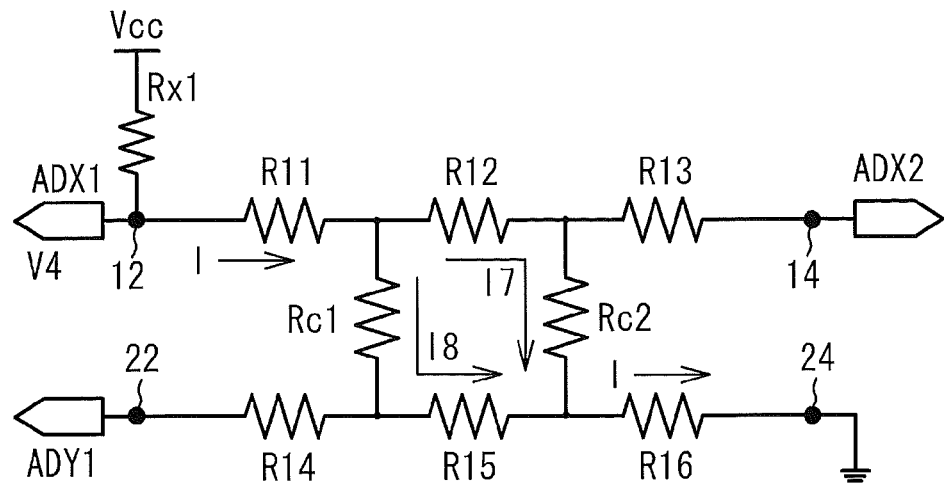
FIG. 10A is a circuit diagram illustrating an example in which a voltage is applied from the XH electrode to the YL electrode.

FIG. 10A is a circuit diagram illustrating an example in which a voltage is applied from the XH electrode 12 to the YL electrode 24. When a path including the resistances R12 and Rc2 is noted, the voltage V4 to be applied from the XH electrode 12 to the YL electrode 24 is denoted by a formula 23.

$$V4 = R11 \times I + (R12 + Rc2) \times I7 + R16 \times I \quad \text{[formula 23]}$$
$$= R11 \times I + (Rd + Rc2) \times I7 + R16 \times I$$

By using the formula 9, divided currents I7 and I8 are denoted by formulas 24 and 25, respectively.

$$I7 = \frac{R15 + Rc1}{R12 + R15 + Rc1 + Rc2}I = \frac{Rd + Rc1}{2Rd + Rc1 + Rc2}I \quad \text{[formula 24]}$$

$$I8 = \frac{R12 + Rc2}{R12 + R15 + Rc1 + Rc2}I = \frac{Rd + Rc2}{2Rd + Rc1 + Rc2}I \quad \text{[formula 25]}$$

Figure 10B:
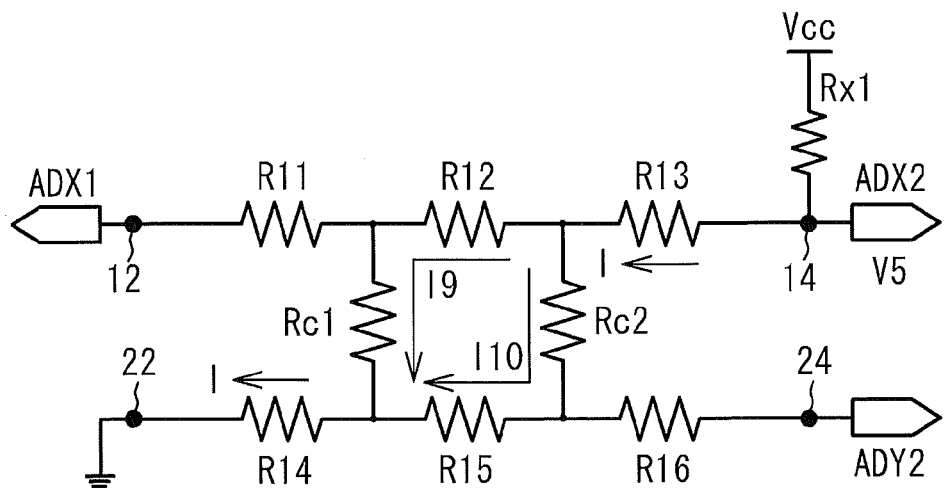
FIG. 10B is a circuit diagram illustrating an example in which a voltage is applied from the XL electrode to the YH electrode.

FIG. 10B is a circuit diagram illustrating an example in which a voltage is applied from the XL electrode 14 to the YH electrode 22. When a path including the resistances R12 and Rc1 is noted, the voltage V5 to be applied from the XL electrode 14 to the YH electrode 22 is denoted by a formula 26.

$$V5 = R13 \times I + (R12 + Rc1) \times I9 + R14 \times I \quad \text{[formula 26]}$$
$$= R13 \times I + (Rd + Rc1) \times I9 + R14 \times I$$

By using the formula 9, divided currents I9 and I10 are denoted by formulas 27 and 28, respectively.

$$I9 = \frac{R15 + Rc2}{R12 + R15 + Rc1 + Rc2}I = \frac{Rd + Rc2}{2Rd + Rc1 + Rc2}I \quad \text{[formula 27]}$$

$$I10 = \frac{R12 + Rc1}{R12 + R15 + Rc1 + Rc2}I = \frac{Rd + Rc1}{2Rd + Rc1 + Rc2}I \quad \text{[formula 28]}$$

Moreover, when a path including the resistances Rc2 and R15 is noted, the voltage V5 can also be denoted by a formula 29.

$$V5 = R13 \times I + (Rd + Rc2) \times I10 + R14 \times I \quad \text{[formula 29]}$$

A formula 30 is calculated from the voltage V2 to V5.

$$(V4 - V2) + (V5 - V3) = (Rd + Rc2) \times I7 - Rc1 \times I3 + \quad \text{[formula 30]}$$
$$(Rd + Rc1) \times I9 - Rc2 \times I5$$
$$= \frac{2Rd^2}{2Rd + Rc1 + Rc2}I$$

In an example in which the power supply voltage Vcc is applied between the YH electrode 22 and the YL electrode 24 as illustrated in FIG. 8B, the voltage V6 and divided currents I11 and I12 are calculated. When a path including the resistances R12, Rc1 and Rc2 is noted, the voltage V6 applied from the YH electrode 22 to the YL electrode 24 is denoted by a formula 31.

$$V6 = R14 \times I + (R12 + Rc1 + Rc2) \times I12 + R16 \times I \quad \text{[formula 31]}$$
$$= R14 \times I + (Rd + Rc1 + Rc2) \times I12 + R16 \times I$$

The divided currents I11 and I12 are denoted by formulas 32 and 33, respectively.

$$I11 = \frac{R12 + Rc1 + Rc2}{R12 + R15 + Rc1 + Rc2} I = \frac{Rd + Rc + Rc2}{2Rd + Rc1 + Rc2} I \quad \text{[formula 32]}$$

$$I12 = \frac{R15}{R12 + R15 + Rc1 + Rc2} I = \frac{Rd}{2Rd + Rc1 + Rc2} I \quad \text{[formula 33]}$$

A formula 34 is calculated by using the voltages V1, and V4 to V6. By the formula 34, a voltage caused by the resistances R11, R13, R14 and R15 is eliminated from the voltages V1 and V6. Thereby, a voltage caused by the resistances R12, Rc1, R15 and Rc2 in the two-point touch can be calculated.

$$V1 + V6 - V4 - V5 = Rd \times I1 + (Rd + Rc1 + Rc2) \times I12 - \quad \text{[formula 34]}$$
$$(Rd + Rc2) \times I7 - (Rd + Rc2) \times I10$$
$$= \frac{2(Rd^2 + Rd \times Rc1 + Rd \times Rc2)}{2Rd + Rc1 + Rc2} I$$
$$= \frac{2Rd^2}{2Rd + Rc1 + Rc2} I +$$
$$\frac{2Rd(Rc1 + Rc2)}{2Rd + Rc1 + Rc2} I$$

Where the first member of the last line of the formula 34 is denoted by the formula 30, and the second member is equal to 2 times of (Rc1+Rc2)×I2 denoted by the formula 16. A formula 35 is drawn from the formula 34.

$$(Rc1 + Rc2)I2 = \quad \text{[formula 35]}$$
$$\frac{Rd(Rc1 + Rc2)}{2Rd + Rc1 + Rc2} I = \frac{1}{2}(V1 + V6 + V2 + V3 - 2V4 - 2V5)$$

The formula 35 can be calculated by using the voltages V1 to V6. That is, a voltage caused by the contact resistances Rc1 and Rc2 can be calculated. By subtracting this voltage from the difference ΔVx1 (formula 15) as denoted by a formula 36 described below, a value ΔVx2 which eliminated the influence of the contact resistances Rc1 and Rc2 from the difference ΔVx1 can be obtained.

$$\Delta Vx2 = \Delta Vx1 - (Rc1 + Rc2)I2 \quad \text{[formula 36]}$$

A difference ΔVy1 between the initial value Vy0 denoted by the formula 4 and the voltage V6 denoted by the formula 31 is denoted by a formula 37.

$$\Delta Vy1 = Vy0 - V6 \quad \text{[formula 37]}$$

A difference ΔVy2 which eliminated the influence of the contact resistances Rc1 and Rc2 is denoted by a formula 38 by using the difference ΔVy1.

$$\Delta Vy2 = \Delta Vy1 - (Rc1 + Rc2)I12 \quad \text{[formula 38]}$$

A voltage (Rc1+Rc2)×I12 caused by the contact resistances Rc1 and Rc2 of the formula 38 is calculated by the formula 35. Therefore, the difference ΔVy2 which eliminated the influence of the contact resistances Rc1 and Rc2 from the difference ΔVy1 can be obtained by using the formulas 35 and 38. As described later, a voltage (Rc1+Rc2)×I12 caused by the contact resistances Rc1 and Rc2 can be calculated by paying attention to the voltage applied to the Y-axis direction and performing the similar calculation.

As described above, the voltage caused by the contact resistances is calculated, and the influence of the contact resistances can be eliminated. Even if the voltage application to the X-axis direction is used or even if the voltage application to the Y-axis direction is used, the voltage (Rc1+Rc2)×I12 becomes the same value, as described later.

In step S16 of FIG. 4, distances Lx and Ly between the two points are calculated by using the differences ΔVx2 and ΔVy2. The distance Lx between the two points in the X-direction is denoted by a formula 39 by using the difference ΔVx2.

$$Lx = \alpha 1 \times \Delta Vx2^2 + \beta 1 \times \Delta Vx2 + \gamma 1 \quad \text{[formula 39]}$$

The distance Ly in the Y-direction is denoted by a formula 40 by using the difference ΔVy2.

$$Ly = \alpha 2 \times \Delta Vy2^2 + \beta 2 \times \Delta Vy2 + \gamma 2 \quad \text{[formula 40]}$$

Suitable values can be used for coefficients α1, α2, β1 and β2, and constant numbers γ1 and γ2 according to the inclination between the two points.

The coordinate detection unit 34 detects the coordinates of the two points by using the distances Lx and Ly and the coordinates Xc and Yc of the middle point (step S17). When the inclination between the two points is the upward inclination to the right as illustrated in FIGS. 11A and 12A, the coordinates of the two points are acquired by a formula 41.

$$(Xc+Lx/2, Yc+Ly/2), (Xc-Lx/2, Yc-Ly/2) \quad \text{[formula 41]}$$

When the inclination between the two points is the downward inclination to the right as illustrated in FIGS. 11B and 12B, the coordinates of the two points are acquired by a formula 42.

$$(Xc+Lx/2, Yc-Ly/2), (Xc-Lx/2, Yc+Ly/2) \quad \text{[formula 42]}$$

When the inclination between the two points is parallel to the X-axis direction, the coordinates of the two points are acquired by a formula 43.

$$(Xc+Lx/2, Yc), (Xc-Lx/2, Yc) \quad \text{[formula 43]}$$

When the inclination between the two points is parallel to the Y-axis direction, the coordinates of the two points are acquired by a formula 44.

$$(Xc, Yc+Ly/2), (Xc, Yc-Ly/2) \quad \text{[formula 44]}$$

According to the first embodiment, the distance is calculated by using the differences ΔΔVx2 and ΔΔVy2 in which the voltage caused by the contact resistances Rc1 and Rc2 is subtracted. Since the influence of the contact resistances is eliminated, correct coordinates can be detected. A difference between the coordinates of the two-point contact by the fingers and the coordinates of the two-point contact by the pens is controlled, and hence almost the same coordinates can be detected. Even when the fingers, the pens, or other means touch the touch panel, the coordinates of the two points can be detected correctly.

In order to calculate the voltage caused by the contact resistances Rc1 and Rc2, the voltages V1 to V6 are used. The voltage V1 is detected in step S7, and the voltage V6 is detected in step S8. Therefore, in step 11, the four voltages V2 to V5 need to be detected by adding appropriate voltages to the voltage V1 and V6, respectively. Since it is not necessary to perform complicated processing, correct coordinates can be detected promptly when the touch panel is touched at the two points. Since each voltage is detected by changing the application direction of each voltage, it is not necessary to add equipment such as the probes, to the touch panel. Therefore, the function and the visibility of the touch panel are secured, and the increase of the cost of the touch panel is controlled. The first embodiment is applicable to a resistance film contact type touch panel. The first embodiment is applicable to an apparatus using the resistance film contact type touch panel, such as an ATM (Auto teller machine), a tablet computer, and a smart phone.

When the touch panel is touched by the fingers, contact areas of the fingers and the resistance film become large, as illustrated in FIG. 2B. Since a plurality of dots are included in the contact areas, it is not necessary to classify the inclination between the two points to the X-axis direction, the Y-axis direction, and an oblique direction strictly. The above-mentioned calculation results should be included in the contact areas. Therefore, the coefficients $\alpha 1$, $\alpha 2$, $\beta 1$ and $\beta 2$, and the constant numbers $\gamma 1$ and $\gamma 2$ in the formulas 39 and 40 may be fixed to a single set of values. When the touch panel is touched at the two points, the inclination between the two points is often slanting. Therefore, the coefficients $\alpha 1$, $\alpha 2$, $\beta 1$ and $\beta 2$, and the constant numbers $\gamma 1$ and $\gamma 2$ in the formulas 39 and 40 may be fixed to values when the inclination is slanting. Thereby, the processing can be speeded up. The coefficients $\alpha 1$, $\alpha 2$, $\beta 1$ and $\beta 2$, and the constant numbers $\gamma 1$ and $\gamma 2$ in the formulas 39 and 40 may be changed to suitable values according to the inclination between the two points. More correct coordinates are detectable.

A description will be given of another calculation method in steps S11 and S15 to S17. Here, the voltage application to the Y-axis direction is used, and voltages V8 to V11 are used instead of the voltage V2 to V5. When a path including the resistance R15 of FIG. 8B is noted, the voltage V6 is denoted by a formula 45.

$$V6 = R14 \times I + R15 \times I11 + R16 \times I \qquad \text{[formula 45]}$$

When the divided current I11 denoted by the formula 32 and the divided current I12 denoted by the formula 33 are used, the difference $\Delta Vy1$ between the initial value $Vy0$ and the voltage V6 is denoted by a formula 46.

$$\begin{aligned}\Delta Vy1 &= Vy0 - V6 \\ &= R15 \times I - R15 \times I11 \\ &= \frac{Rd^2}{2Rd + Rc1 + Rc2} I\end{aligned} \qquad \text{[formula 46]}$$

When a path including the resistances Rc1, Rc2 and R12 of FIG. 8B, the voltage V6 is denoted by the formula 31. By using the formula 31, the difference $\Delta Vy1$ is denoted by a formula 47.

$$\Delta Vy1 = Rd \times I - (Rd + Rc1 + Rc2) \times I12 \qquad \text{[formula 47]}$$

A formula 48 is drawn from the formulas 47 and 33.

$$\begin{aligned}(Rc1 + Rc2) \times I12 &= Rd \times I - Rd \times \frac{Rd}{2Rd + Rc1 + Rc2} \\ &\quad I - \Delta Vy1 \\ &= \frac{Rd(Rc1 + Rc2)}{2Rd + Rc1 + Rc2} I\end{aligned} \qquad \text{[formula 48]}$$

Figure 13A:
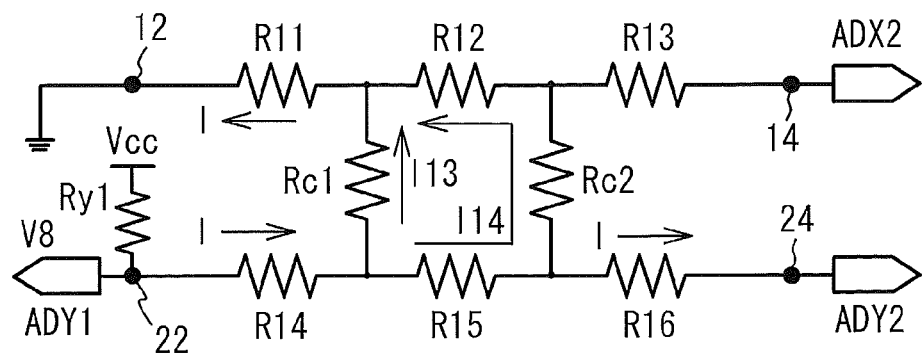
FIG. 13A is a circuit diagram illustrating an example in which a voltage is applied from the YH electrode to the XH electrode.

FIG. 13A is a circuit diagram illustrating an example in which a voltage is applied from the YH electrode 22 to the XH electrode 12. The YH electrode 22 is connected to the power supply voltage Vcc, and the XH electrode 12 is grounded. The current I flows from the YH electrode 22 to the XH electrode 12. When a path including the contact resistance Rc1 is noted, the voltage V8 to be applied from the YH electrode 22 to the XH electrode 12 is denoted by a formula 49.

$$V8 = R11 \times I + Rc1 \times I13 + R14 \times I \qquad \text{[formula 49]}$$

By using the formula 9, divided currents I13 and I14 are denoted by formulas 50 and 51, respectively.

$$I13 = \frac{R12 + R15 + Rc2}{R12 + R15 + Rc1 + Rc2} I = \frac{2Rd + Rc2}{2Rd + Rc1 + Rc2} I \qquad \text{[formula 50]}$$

$$I14 = \frac{Rc1}{R12 + R15 + Rc1 + Rc2} I = \frac{Rc1}{2Rd + Rc1 + Rc2} I \qquad \text{[formula 51]}$$

Figure 13B:
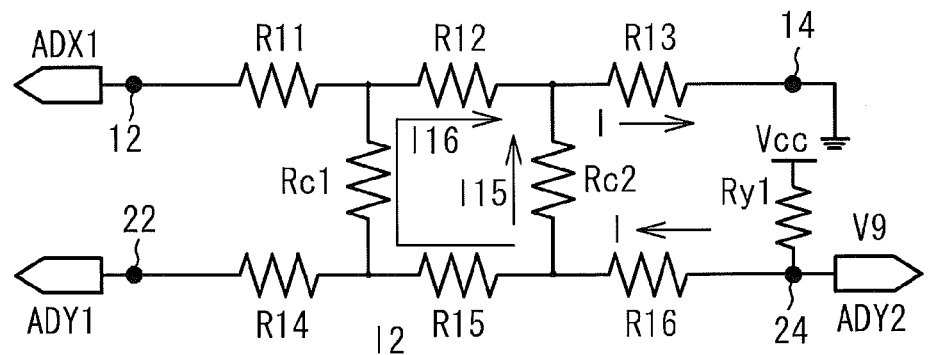
FIG. 13B is a circuit diagram illustrating an example in which a voltage is applied from the YL electrode to the XL electrode.

FIG. 13B is a circuit diagram illustrating an example in which a voltage is applied from the YL electrode 24 to the XL electrode 14. When a path including the contact resistance Rc2 is noted, a voltage V9 to be applied from the YL electrode 24 to the XL electrode 14 is denoted by a formula 52.

$$V9 = R13 \times I + Rc2 \times I15 + R16 \times I \qquad \text{[formula 52]}$$

By using the formula 9, divided currents I15 and I16 are denoted by formulas 53 and 54, respectively.

$$I15 = \frac{R12 + R15 + Rc1}{R12 + R15 + Rc1 + Rc2} I = \frac{2Rd + Rc1}{2Rd + Rc1 + Rc2} I \qquad \text{[formula 53]}$$

$$I16 = \frac{Rc2}{R12 + R15 + Rc1 + Rc2} I = \frac{Rc2}{2Rd + Rc1 + Rc2} I \qquad \text{[formula 54]}$$

Figure 14A:
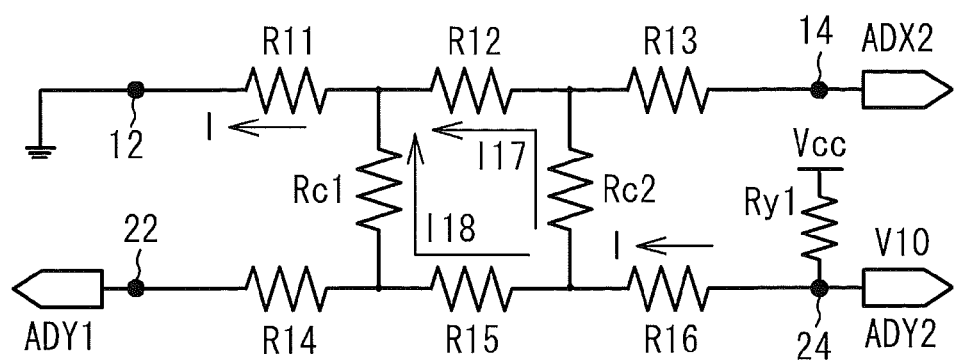
FIG. 14A is a circuit diagram illustrating an example in which a voltage is applied from the YL electrode to the XH electrode.

FIG. 14A is a circuit diagram illustrating an example in which a voltage is applied from the YL electrode 24 to the XH electrode 12. When a path including the resistances R12 and Rc2 is noted, a voltage V10 to be applied from the YL electrode 24 to the XH electrode 12 is denoted by a formula 55.

$$\begin{aligned}V10 &= R11 \times I + (R12 + Rc2) \times I17 + R16 \times I \\ &= R11 \times I + (Rd + Rc2) \times I17 + R16 \times I\end{aligned} \qquad \text{[formula 55]}$$

By using the formula 9, divided currents I17 and I18 are denoted by formulas 56 and 57, respectively.

$$I17 = \frac{R15 + Rc1}{R12 + R15 + Rc1 + Rc2}I = \frac{Rd + Rc1}{2Rd + Rc1 + Rc2}I \quad \text{[formula 56]}$$

$$I18 = \frac{R12 + Rc2}{R12 + R15 + Rc1 + Rc2}I = \frac{Rd + Rc2}{2Rd + Rc1 + Rc2}I \quad \text{[formula 57]}$$

Figure 14B:
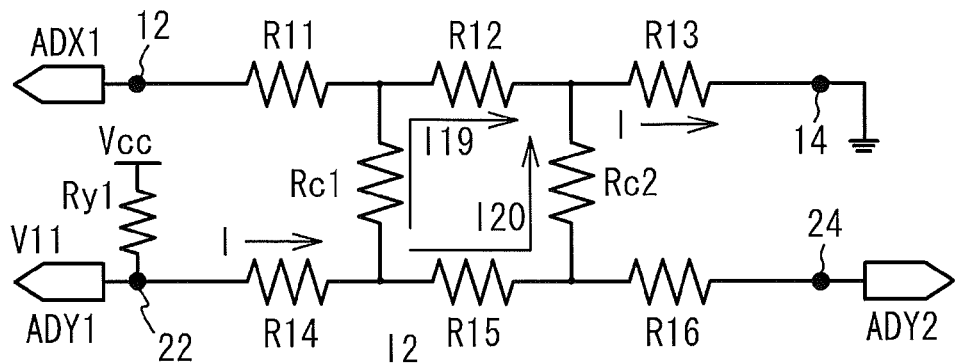
FIG. 14B is a circuit diagram illustrating an example in which a voltage is applied from the YH electrode to the XL electrode.

FIG. 14B is a circuit diagram illustrating an example in which a voltage is applied from the YH electrode 22 to the XL electrode 14. When a path including the resistances R12 and Rc1 is noted, a voltage V11 to be applied from the YH electrode 22 to the XL electrode 14 is denoted by a formula 58.

$$V11 = R13 \times I + (R12 + Rc1) \times I19 + R14 \times I \quad \text{[formula 58]}$$
$$= R13 \times I + (Rd + Rc1) \times I19 + R14 \times I$$

By using the formula 9, divided currents I19 and I20 are denoted by formulas 59 and 60, respectively.

$$I19 = \frac{R15 + Rc2}{R12 + R15 + Rc1 + Rc2}I = \frac{Rd + Rc2}{2Rd + Rc1 + Rc2}I \quad \text{[formula 59]}$$

$$I20 = \frac{R12 + Rc1}{R12 + R15 + Rc1 + Rc2}I = \frac{Rd + Rc1}{2Rd + Rc1 + Rc2}I \quad \text{[formula 60]}$$

Moreover, when a path including the resistances Rc2 and R 15 is noted, the voltage V11 can be denoted by the formula 61.

$$V11 = R13 \times 1 + (Rd + Rc2) \times I20 + R14 \times I \quad \text{[formula 61]}$$

A formula 62 is calculated from the voltages V8 to V11.

$$(V10 - V8) + (V11 - V9) = (Rd + Rc2) \times I17 - Rc1 \times \quad \text{[formula 62]}$$
$$I13 + (Rd + Rc1) \times I19 -$$
$$Rc2 \times I15$$
$$= \frac{2Rd^2}{2Rd + Rc1 + Rc2}I$$

A formula 63 is calculated by using the voltages V1, V6, V10 and V11. The formula 63 eliminates the voltages caused by the resistances R11, R13, R14 and R15 from the voltages V1 and V6. Thereby, a voltage caused by the resistances R12, Rc1, R15 and Rc2 in the two-point touch can be calculated.

$$V1 + V6 - V10 - V11 = Rd \times I1 + (Rd + Rc1 + Rc2) \times \quad \text{[formula 63]}$$
$$I12 - (Rd + Rc2) \times I17 -$$
$$(Rd + Rc2) \times I20$$
$$= \frac{2(Rd^2 + Rd \times Rc1 + Rd \times Rc2)}{2Rd + Rc1 + Rc2}I$$
$$= \frac{2Rd^2}{2Rd + Rc1 + Rc2}I +$$

-continued
$$\frac{2Rd + (Rc1 + Rc2)}{2Rd + Rc1 + Rc2}I$$

Where the first member of the last line of the formula 63 is denoted by the formula 62, and the second member is equal to 2 times of (Rc1+Rc2)×I2 denoted by the formula 48. A formula 64 is drawn from the formula 63.

$$(Rc1 + Rc2)I2 = \frac{Rd(Rc1 + Rc2)}{2Rd + Rc1 + Rc2}I = \quad \text{[formula 64]}$$
$$\frac{1}{2}(V1 + V6 + V8 + V9 - 2V10 - 2V11)$$

The formula 64 can be calculated by using the voltages V1, V6, V8 to V11. That is, the voltage caused by the contact resistances Rc1 and Rc2 can be calculated. The difference ΔVx2 denoted by the formula 36 and the difference ΔVy2 denoted by the formula 38 can be calculated by using the voltage calculated by the formula 64. Here, since the second member of the formula 64 is equal to the second member of the formula 35, the formula 64 is equal to the formula 35. Therefore, in order to calculate the voltage caused by the contact resistances Rc1 and Rc2, any one of the formulas 35 and 64 may be used. That is, any one of the calculation of the formulas 5 to 36 and the calculation of the formulas 45 to 64 should be performed. Since it is not necessary to perform complicated processing, correct coordinates can be detected promptly when the touch panel is touched at the two points.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel, comprising:
   a first resistance film;
   a second resistance film that is spaced apart from the first resistance film, and is opposite to the first resistance film;
   a first electrode and a second electrode that are provided on the first resistance film, and are opposite to each other in a first direction;
   a third electrode and a fourth electrode that are provided on the second resistance film, and are opposite to each other in a second direction that intersects with the first direction;
   an application unit that controls on/off of switches connected between a power supply and the first to the fourth electrodes and between a ground and the first to the fourth electrodes to apply voltages to the first to the fourth electrodes, respectively; and
   a coordinate detection unit that, when the first resistance film comes in contact with the second resistance film at two points, detects coordinates of the two points based on a voltage applied between the first electrode and the second electrode, a voltage applied between the third electrode and the fourth electrode, and a voltage caused by contact resistances between the first resistance film and the second resistance film, wherein the coordinate detection unit detects a distance between the two points in a first direction based on a voltage acquired by subtracting a voltage between the first electrode and the second electrode when the first resistance film comes in contact with the second resistance film at two points, and the voltage caused by the contact resistances, from a voltage between the first electrode and the second electrode when the first resistance film does not come in contact with the second resistance film, and detects a distance between the two points in a second direction based on a voltage acquired by subtracting a voltage between the third electrode and the fourth electrode when the first resistance film comes in contact with the second resistance film at two points, and the voltage caused by the contact resistances, from a voltage between the third electrode and the fourth electrode when the first resistance film does not come in contact with the second resistance film.

2. The touch panel as claimed in claim 1, wherein the coordinate detection unit detects the coordinates of the two points based on the distance between the two points, coordinates of a middle point between the two points, and inclination between the two points.

3. The touch panel as claimed in claim 2, wherein the coordinate detection unit detects the coordinates of the two points based on the calculated distance in the first direction and the calculated distance in the second direction.

4. The touch panel as claimed in claim 1, wherein when the first resistance film comes in contact with the second resistance film at two points, the application unit controls on/off of switches connected between the power supply and the first to the fourth electrodes and between the ground and the first to the fourth electrodes to apply voltages between the first electrode and the third electrode, the second electrode and the fourth electrode, the first electrode and the fourth electrode, and the second electrode and the third electrode, respectively, and the coordinate detection unit calculates the voltage caused by the contact resistances by using the voltage applied between the first electrode and the second electrode, the voltage applied between the third electrode and the fourth electrode, the voltage between the first electrode and the third electrode, the voltage between the second electrode and the fourth electrode, the voltage between the first electrode and the fourth electrode, and the voltage between the second electrode and the third electrode.

5. The touch panel as claimed in claim 4, wherein when it is assumed that a voltage $V1$ is applied from the first electrode to the second electrode, a voltage $V2$ is applied from the first electrode to the third electrode, a voltage $V3$ is applied from the second electrode to the fourth electrode, a voltage $V4$ is applied from the first electrode to the fourth electrode, a voltage $V5$ is applied from the second electrode to the third electrode, and a voltage $V6$ is applied from the third electrode to the fourth electrode, the coordinate detection unit calculates the voltage caused by the contact resistances as $\frac{1}{2}*(V1+V6+V2+V3-2V4-2V5)$.

6. The touch panel as claimed in claim 4, wherein it is assumed that a voltage $V1$ is applied from the first electrode to the second electrode, a voltage $V8$ is applied from the third electrode to the first electrode, a voltage $V9$ is applied from the fourth electrode to the second electrode, a voltage $V10$ is applied from the fourth electrode to the first electrode, a voltage $V11$ is applied from the third electrode to the second electrode, and a voltage $V6$ is applied from the third electrode to the fourth electrode, the coordinate detection unit calculates the voltage caused by the contact resistances as $\frac{1}{2}*(V1+V6+V8+V9-2V10-2V11)$.

7. A touch panel, comprising:
a first resistance film;
a second resistance film;
a first electrode provided at one end of the first resistance film and a second electrode provided at another end of the first resistance film, in a first direction;
a third electrode provided at one end of the second resistance film and a fourth electrode provided at another end of the second resistance film, in a second direction that intersects with the first direction; and
a controller, configured to
control voltage applications to each of the first electrode to the fourth electrode, and calculate a voltage caused by contact resistances between the first resistance film and the second resistance film, based on each of voltages (a) through (f) detected when the first resistance film contacts with the second resistance film:
(a) a voltage between the first electrode and the second electrode,
(b) a voltage between the third electrode and the fourth electrode,
(c) a voltage between the first electrode and the third electrode,
(d) a voltage between the second electrode and the fourth electrode,
(e) a voltage between the first electrode and the fourth electrode, and
(f) a voltage between the second electrode and the third electrode.

8. The touch panel as claimed in claim 7, wherein the voltage caused by the contact resistances is calculated as:

[voltage (a)+voltage (b)+voltage (c)+voltage (d)−2*voltage (e)−2*voltage (f)]/2.

9. The touch panel as claimed in claim 7, wherein
the controller calculates a distance between two points in a first direction in which the first resistance film contacts with the second resistance film, based on
(g) a voltage acquired by subtracting, from a voltage between the first electrode and the second electrode when the first resistance film is not in contact with the second resistance film, the voltage between the first electrode and the second electrode when the first resistance film comes in contact with the second resistance film and the voltage caused by the contact resistances, and calculates a distance between two points in a second direction in which the first resistance film contacts with the second resistance film, based on (h) a voltage acquired by subtracting, from a voltage between the third electrode and the fourth electrode when the first resistance film is not in contact with the second resistance film, the voltage between the third electrode and the fourth electrode when the first resistance film comes in contact with the second resistance film, and the voltage caused by the contact resistances.

10. The touch panel as claimed in claim 7, wherein
the controller determines whether a line segment coupling two points in which the first resistance film contacts with the second resistance film incline or not, by:
(i) comparing the voltage between the first electrode and the second electrode when the first resistance film is not in contact with the second resistance film, and the voltage between the first electrode and the second electrode when the first resistance film comes in contact with the second resistance film; and
(j) comparing the voltage between the third electrode and the fourth electrode when the first resistance film is not in contact with the second resistance film, and the voltage between the third electrode and the fourth electrode when the first resistance film comes in contact with the second resistance film.

11. The touch panel as claimed in claim 7, wherein
the controller determines whether a line segment coupling two points in which the first resistance film contacts with the second resistance film incline or not, by:
(k) comparing the voltage at the third electrode and the voltage at the fourth electrode detected when the power supply voltage is applied between the first electrode and the second electrode; and
(l) comparing the voltage at the first electrode and the voltage at the second electrode detected when the power supply voltage is applied between the third electrode and the fourth electrode.

12. A touch panel, comprising:
a first resistance film;
a second resistance film;
a first electrode provided at one end of the first resistance film and a second electrode provided at another end of the first resistance film so as to face each other in a first direction, and to one of which a power source voltage is applied via a resistor;
a third electrode provided at one end of the second resistance film and a fourth electrode provided at another end of the second resistance film so as to face each other in a second direction that intersects with the first direction, and to one of which the power source voltage is applied via a resistor; and
a controller, configured to
detect, when the first resistance film is in contact with the second resistance film, each of
(a) a voltage at the first electrode when the first electrode is connected to the power source voltage, the second electrode is connected to a given voltage lower than the power source voltage, and the third electrode and the fourth electrode are disconnected from the power source voltage and the given voltage,
(b) a voltage at the third electrode when the third electrode is connected to the power source voltage, the fourth electrode is connected to the given voltage, and the first electrode and the second electrode are disconnected from the power source voltage and the given voltage,
(c) a voltage at the first electrode when the first electrode is connected to the power source voltage, the third electrode is connected to the given voltage, and the second electrode and the fourth electrode are disconnected from the power source voltage and the given voltage,
(d) a voltage at the second electrode when the second electrode is connected to the power source voltage, the fourth electrode is connected to the given voltage, and the second electrode and the third electrode are disconnected from the power source voltage and the given voltage,
(e) a voltage at the first electrode when the first electrode is connected to the power source voltage, the fourth electrode is connected to the given voltage, and the second electrode and the third electrode are disconnected from the power source voltage and the given voltage, and
(f) a voltage at the second electrode when the second electrode is connected to the power source voltage, the third electrode is connected to the given voltage, and the first electrode and the fourth electrode are disconnected from the power source voltage and the given voltage, and
calculate a voltage caused by contact resistances between the first resistance film and the second resistance film, based on each of voltage (a) through voltage (f).

\* \* \* \* \*